(12) United States Patent
Cottet et al.

(10) Patent No.: US 12,012,201 B2
(45) Date of Patent: Jun. 18, 2024

(54) ASSEMBLY COMPRISING A VANE AND A VANE PITCH SETTING SYSTEM

(71) Applicant: SAFRAN AIRCRAFT ENGINES, Paris (FR)

(72) Inventors: Clément Cottet, Moissy-Cramayel (FR); Vivien Mickaël Courtier, Moissy-Cramayel (FR); Vincent Joudon, Moissy-Cramayel (FR); Thierry Georges Paul Papin, Moissy-Cramayel (FR)

(73) Assignee: Safran Aircraft Engines, Paris (FR)

( * ) Notice: Subject to any disclaimer, the term of this patent is extended or adjusted under 35 U.S.C. 154(b) by 0 days.

(21) Appl. No.: 18/006,106

(22) PCT Filed: Jul. 15, 2021

(86) PCT No.: PCT/FR2021/051313
§ 371 (c)(1),
(2) Date: Jan. 19, 2023

(87) PCT Pub. No.: WO2022/018356
PCT Pub. Date: Jan. 27, 2022

(65) Prior Publication Data
US 2023/0294816 A1 Sep. 21, 2023

(30) Foreign Application Priority Data

Jul. 24, 2020 (FR) .................................... 2007809
Jul. 24, 2020 (FR) .................................... 2007812
Mar. 9, 2021 (FR) .................................... 2102242

(51) Int. Cl.
*B64C 11/06* (2006.01)
*F01D 7/00* (2006.01)
(Continued)

(52) U.S. Cl.
CPC ................ *B64C 11/06* (2013.01); *F01D 7/00* (2013.01); *F04D 29/323* (2013.01); *F04D 29/644* (2013.01); *F05D 2260/70* (2013.01)

(58) Field of Classification Search
None
See application file for complete search history.

(56) References Cited

U.S. PATENT DOCUMENTS 2,648,391 A * 8/1953 Cushman ................ B64C 11/06
416/135
2,704,129 A 3/1955 Cushman
(Continued)

FOREIGN PATENT DOCUMENTS

CA 2778569 A1 12/2012
EP 2674357 A2 * 12/2013 ............. B64C 11/06
(Continued)

OTHER PUBLICATIONS

International Search Report mailed Nov. 5, 2021, issued in corresponding International Application No. PCT/FR2021/051313, filed Jul. 15, 2021, 7 pages.
(Continued)

*Primary Examiner* — Juan G Flores
(74) *Attorney, Agent, or Firm* — Christensen O'Connor Johnson Kindness PLLC

(57) ABSTRACT

An assembly for an aircraft turbine engine is provided. The assembly generally includes an un-ducted propeller blade of which the root has a bulbous portion; a system for setting the pitch of the blade about a pitch setting axis, the pitch setting system including a cup, configured to be placed inside the outer casing, has a flared open top end for axial insertion of the root and in which the root of the blade can be axially (Continued)

affixed by a locking member; and at least one radial retention prong in a radial space reserved between the wall of the cup and the root.

15 Claims, 17 Drawing Sheets

(51) Int. Cl.
*F04D 29/32* (2006.01)
*F04D 29/64* (2006.01)

(56) References Cited

U.S. PATENT DOCUMENTS

| | | | |
|---|---|---|---|
| 3,061,341 A | 10/1962 | Gryzch et al. | |
| 4,762,466 A | 8/1988 | Bouiller et al. | |
| 5,039,278 A | 8/1991 | Wakeman et al. | |
| 5,118,256 A * | 6/1992 | Violette | F16C 27/066 |
| | | | 416/239 |
| 8,801,383 B2 | 8/2014 | Soule | |
| 9,328,737 B2 | 5/2016 | Bouru et al. | |
| 2002/0008177 A1 | 1/2002 | Violette | |
| 2008/0279689 A1 | 11/2008 | Sebald | |
| 2010/0239421 A1 | 9/2010 | Boston et al. | |
| 2013/0094943 A1 | 4/2013 | Bouru et al. | |
| 2013/0343896 A1 | 12/2013 | Mackie et al. | |
| 2015/0330233 A1 * | 11/2015 | Petellaz | F04D 29/322 |
| | | | 29/889.7 |
| 2016/0290228 A1 | 10/2016 | van der Merwe et al. | |
| 2017/0190433 A1 | 7/2017 | Monton et al. | |
| 2020/0056490 A1 | 2/2020 | Bailey | |

FOREIGN PATENT DOCUMENTS

| | | |
|---|---|---|
| FR | 2993920 A1 | 1/2014 |
| FR | 3 017 163 A1 | 8/2015 |
| FR | 3 021 030 A1 | 11/2015 |
| FR | 3 080 322 A1 | 10/2019 |
| WO | 2011009702 A1 | 1/2011 |
| WO | 2015121579 A1 | 8/2015 |

OTHER PUBLICATIONS

Written Opinion mailed Nov. 5, 2021, issued in corresponding International Application No. PCT/FR2021/051313, filed Jul. 15, 2021, 7 pages.

* cited by examiner

ASSEMBLY COMPRISING A VANE AND A VANE PITCH SETTING SYSTEM

TECHNICAL FIELD OF THE INVENTION

The present invention relates to the field of aircraft turbine engines and in particular to the propulsion propellers of these turbine engines which comprise variable setting vanes.

TECHNICAL BACKGROUND

The prior art comprises in particular the documents FR-A1-3 017 163 and FR-A1-3 080 322.

An aircraft turbine engine propeller can be ducted, as in the case of a fan for example, or un-ducted, as in the case of an open-rotor architecture for example.

A propeller comprises vanes which may be variable setting. The turbine engine then comprises a setting system that allows the setting angle of the vanes to be changed in order to adapt the thrust generated by the propeller to the different phases of flight.

The design of a propeller vane involves several disciplines with generally conflicting objectives. It must allow optimal aerodynamic performance (i.e. provide a thrust while maximising the efficiency), guarantee a mechanical strength of the vane (i.e. withstand the mechanical stresses resulting from static and dynamic loadings) while limiting the mass and the acoustic signature. In particular, the improvement in the aerodynamic performance of the propeller tends towards an increase of the BPR (By Pass Ratio), which translates into an increase in its external diameter and therefore in the span of the vanes.

In all of the prior art attachments, the vane root is mounted in a metal cuff interfacing with the rollings to allow the variable setting. These metal parts are an integral portion of the vane. In the event of vane loss, these metal parts, which have a high density compared to the composite material making up the rest of the vane, have significant energy. However, the energy of the debris dropped on an un-ducted architecture is a fundamental element to be optimised because it can hit the fuselage. It is therefore an element to be taken into account for the dimensioning of a shielding of the fuselage and a fortiori for the mass of the aircraft.

The aim of the invention is to reduce the risk of the fuselage being hit by elements that could damage it, even if the means for attaching the vane to the setting system fails.

Another way of optimising the aerodynamic performance is to improve the efficiency near the hub by improving the quality of the aerodynamic flow. The control of this flow is all the more complex as the vane is generally of variable setting.

A variable setting blade propeller essentially comprises a hub rotating about an axis of rotation and equipped with housings for vanes which are mounted pivotally movable about pitch setting axes in these housings, the setting axes extending radially with respect to the axis of rotation of the hub. Each vane comprises a root from which a blade extends. The root is mounted in a corresponding housing of the hub by means of a bearing oriented along the radial axis, which is interposed between an internal structure of the hub and the root of the vane in order to allow the pivoting.

The hub usually comprises an external casing that forms an aerodynamic fairing of the hub. In this casing there are openings through which the housings open and through which the roots of the vanes are inserted into the hub.

There are therefore aerodynamic discontinuities at the level of this fairing in the vicinity of the openings, on the one hand between the roots of the vanes and the edges of the openings, and on the other hand between the roots of the vanes and the blades of the vanes. These aerodynamic discontinuities cause turbulence around the base of the blades, which deteriorates the overall aerodynamic efficiency of the propeller.

In a known technical solution, a blade platform is provided which obturates the hole in the hub. The design of this platform allows to ensure a good geometric continuity at a particular setting and therefore a particular flight point. This point is traditionally chosen as the point at which performance is to be optimised. When the setting is changed, the platform creates a step with the hub. This breakage in the geometry is then a source of loss of efficiency for the blades.

The platform is not a component that is systematically present in the prior art of un-ducted engine architectures.

Furthermore, when present, the platform is a cowling element to achieve the aerodynamic performance and has no structural function.

SUMMARY OF THE INVENTION

The invention relates to an assembly comprising an un-ducted propeller vane and a system for setting the pitch of the vane, for an aircraft turbine engine, which comprises:
  a vane comprising a blade connected to a connection root which is intended to be attached to a hub of the propeller and which is intended to be received in an associated opening of an external casing of the hub, the root having a bulbous-shaped segment;
  a system for setting the pitch of the vane about a setting axis, the pitch setting system comprising a cup which is intended to be arranged inside the external casing, which comprises an open flared upper end for axial insertion of the root into an annular wall of the cup, and in which the root of the vane is axially attached by an immobilisation member which is attached to the cup, the receiving cup being intended to be pivotally mounted about the setting axis relative to the hub;
  characterised in that it comprises at least one retention prong which extends radially from the wall of the cup into a radial space reserved between the wall of the cup and the root, the prong being arranged axially opposite the bulb, the prong being capable of retaining the root of the vane inside the cup by contact with the bulb in the event of failure of the member for attaching the root in the cup.

According to another aspect of the assembly made according to the teachings of the invention, the prong is made in one part with a support member which is fitted and attached to the cup.

In a further aspect of the assembly made in accordance with the teachings of the invention, the support member comprises an axial attachment tab which is attached against an internal face of the cup and from which the prong extends radially.

In a further aspect of the assembly made in accordance with the teachings of the invention, the support member comprises a radial plate for attaching a platform intended to obturate the associated opening in the casing, the attachment plate being arranged at an upper end of the attachment tab, the plate extending above an upper end edge of the cup.

According to another aspect of the assembly made in accordance with the teachings of the invention, the prong is likely to bend to dampen a displacement of the root of the vane axially in the event of failure of the member for immobilising the root in the cup.

According to another aspect of the assembly made in accordance with the teachings of the invention, the prong has a main stretch directed radially inwards from the attachment tab and an end stretch curved radially outwards to promote the deformation of the prong in the event of axial displacement of the root of the vane.

According to another aspect of the assembly made in accordance with the teachings of the invention, the prong is elastically deformable in bending over at least one portion of its bending movement.

According to another aspect of the assembly made in accordance with the teachings of the invention, in the attached position of the root of the vane in the cup, the prong is arranged axially at a distance from the bulb of the root.

According to another aspect of the assembly made in accordance with the teachings of the invention, in the attached position of the root of the vane in the cup, the prong is arranged pre-stressed in bending against the bulb of the root.

According to another aspect of the assembly made in accordance with the teachings of the invention, the support member comprises a plurality of prong which are regularly distributed around the root of the vane.

According to another aspect of the assembly made in accordance with the teachings of the invention, the support member is made in a plurality of distinct sectors, each of which is independently attached to the cup.

In a further aspect of the assembly made in accordance with the teachings of the invention, the cup comprises a shoulder face which extends radially inwardly from its internal face and which axially supports upwardly the support member.

According to another aspect of the assembly made in accordance with the teachings of the invention, the shoulder face is formed by the lower face of a rim which extends radially inwardly from the upper end edge of the cup.

According to another aspect of the assembly made in accordance with the teachings of the invention, the support member is in radial outward support against the internal face of the cup.

According to another aspect of the assembly made in accordance with the teachings of the invention, the support member is attached to the cup by means of an attachment screw which is received in through orifices having a diameter greater than the diameter of its rod, the screw being screwed into a nut mounted with a radial run-out in the orifice of the cup or in the orifice of the attachment member so that axial forces applied to the prong upwards pass only through the shoulder face against which the attachment member abuts.

According to another aspect of the assembly made in accordance with the teachings of the invention, the immobilisation member is formed by an immobilisation ring which extends around said axis and which is configured to be mounted around the root, this immobilisation ring being configured to be mounted inside the cup and to cooperate respectively with the root and the annular wall of the cup in order to ensure the axial retention of the root in the cup.

According to another aspect of the assembly made in accordance with the teachings of the invention, a segment of the prong extends axially opposite the immobilisation ring.

According to another aspect of the assembly made in accordance with the teachings of the invention, the immobilisation ring is a dogging ring which comprises external dog teeth configured to cooperate with internal dog teeth complementary with the annular wall of the cup.

According to another aspect of the assembly made in accordance with the teachings of the invention, the immobilisation ring has a wedge shape in cross-section and is configured, under the effect of the centrifugal forces in operation, to be biased axially outwards of the cup and to maintain the vane root axially tightened by wedge effect.

According to another aspect of the assembly made according to the teachings of the invention, it further comprises:
  a lower rolling guide bearing extending around said axis and mounted around a lower portion of the annular wall,
  an upper rolling guide bearing extending around said axis and mounted around an upper portion of the annular wall,
  at least one of the guide bearings having its internal ring integrated with said cup.

The invention also relates to a turbine engine, in particular for an aircraft, comprising at least one assembly according to the teachings of the invention.

BRIEF DESCRIPTION OF THE FIGURES

Further characteristics and advantages of the invention will become apparent from the following detailed description, for the understanding of which reference is made to the attached drawings in which.

DETAILED DESCRIPTION OF THE INVENTION

Figure 1:
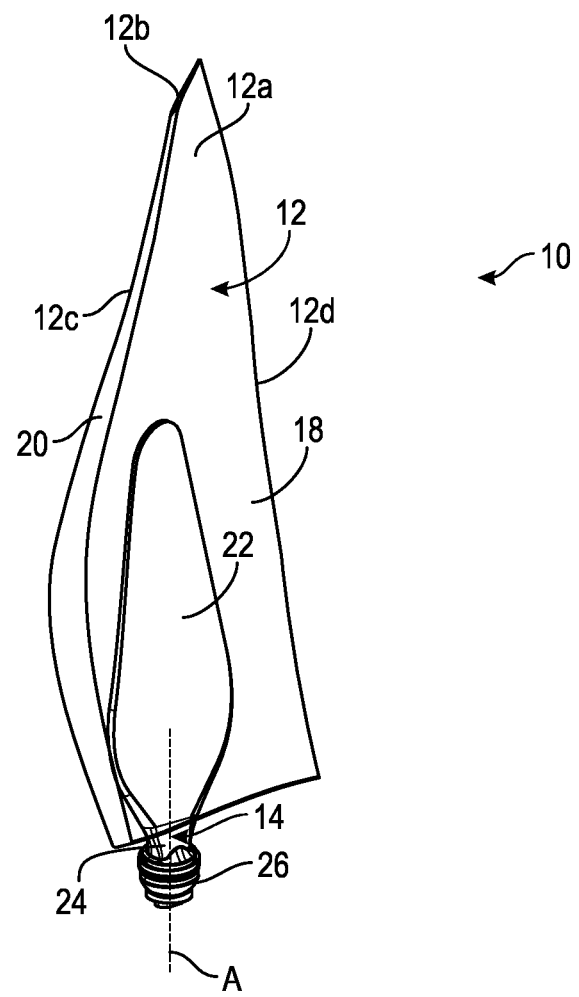
FIG. 1 is a schematic perspective view of a propeller vane for an aircraft turbine engine, and illustrates the present invention.
Figure 2:
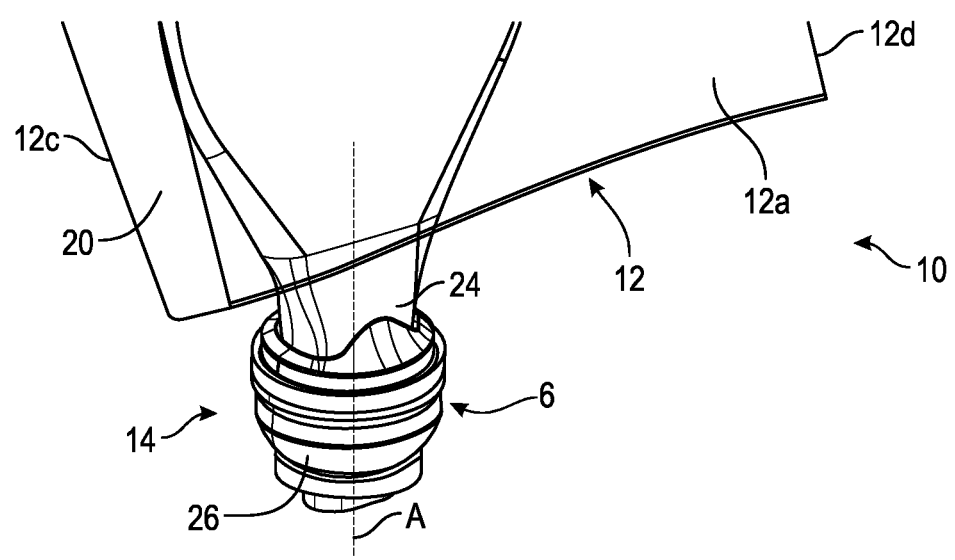
FIG. 2 is a larger scale view of a portion of FIG. 1 and shows the root of the vane.

FIG. 1 shows a vane 10 for a propeller of an aircraft turbine engine, this propeller being either ducted or un-ducted.

The vane 10 comprises a blade 12 connected to a root 14.

The blade 12 has an aerodynamic profile and comprises an intrados 12a and an extrados 12b which are connected by an upstream leading edge 12c and a downstream trailing edge 12d, the terms upstream and downstream referring to the flowing of the gases around the blade 12 in operation.

The blade 12 has an upper end which is free, referred to as summit, and a lower end which is connected to the root 14.

In the example shown, the vane 10 is made of a composite material by an injection method referred to as RTM method (Resin Transfer Molding). This method consists of preparing a fibrous preform 18 by three-dimensional weaving, then placing this preform in a mould and injecting a polymerisable resin, such as an epoxy resin, which will impregnate the preform. After the blade 12 has cured and hardened, its leading edge 12c is usually reinforced by a metal sheath 20 which is fitted and attached, for example by gluing.

The vane 10 here comprises a spar 22 which comprises a portion forming a core of the blade 12 and which is intended to be inserted into the preform 18 prior to the resin injection, and a portion which extends from the side opposite the summit of the blade 12 to form a portion of the root 14, referred to as body 24.

The spar 22 is preferably made of a 3D woven carbon fibre reinforced epoxy organic matrix composite material with the warp direction predominantly radially oriented and the weft predominantly oriented along the chord of the blade 12 at the height of the aerodynamic duct. However, the spar can also be a more mechanically advantageous assembly of different organic matrix composite materials (thermoset, thermoplastic or elastomer) reinforced with long fibres (carbon, glass, aramid, polypropylene) in different fibrous arrangements (woven, braided, knitted, unidirectional).

Although not shown, the blade 12 may be hollow or solid and comprises an internal cavity filled with a foam or honeycomb type filler material. This filler material is installed around the spar 22 and is covered with a skin of organic matrix composite material to increase the impact resistance of the blade 12.

The sheath 20 may be titanium or titanium alloy, stainless steel, steel, aluminium, nickel, etc. The intrados 12a or even the extrados 12b of the blade 12 may be covered with a polyurethane film for the protection against erosion.

The axis "A" is an axis of elongation of the vane 10 and of the blade 12 and in particular an axis "A" of setting of the vane 10, i.e. the axis about which the angular position of the vane 10 is adjusted. It is generally also a radial axis which therefore extends along a radius with respect to the axis of rotation of the propeller equipped with this vane 10.

Figure 8:
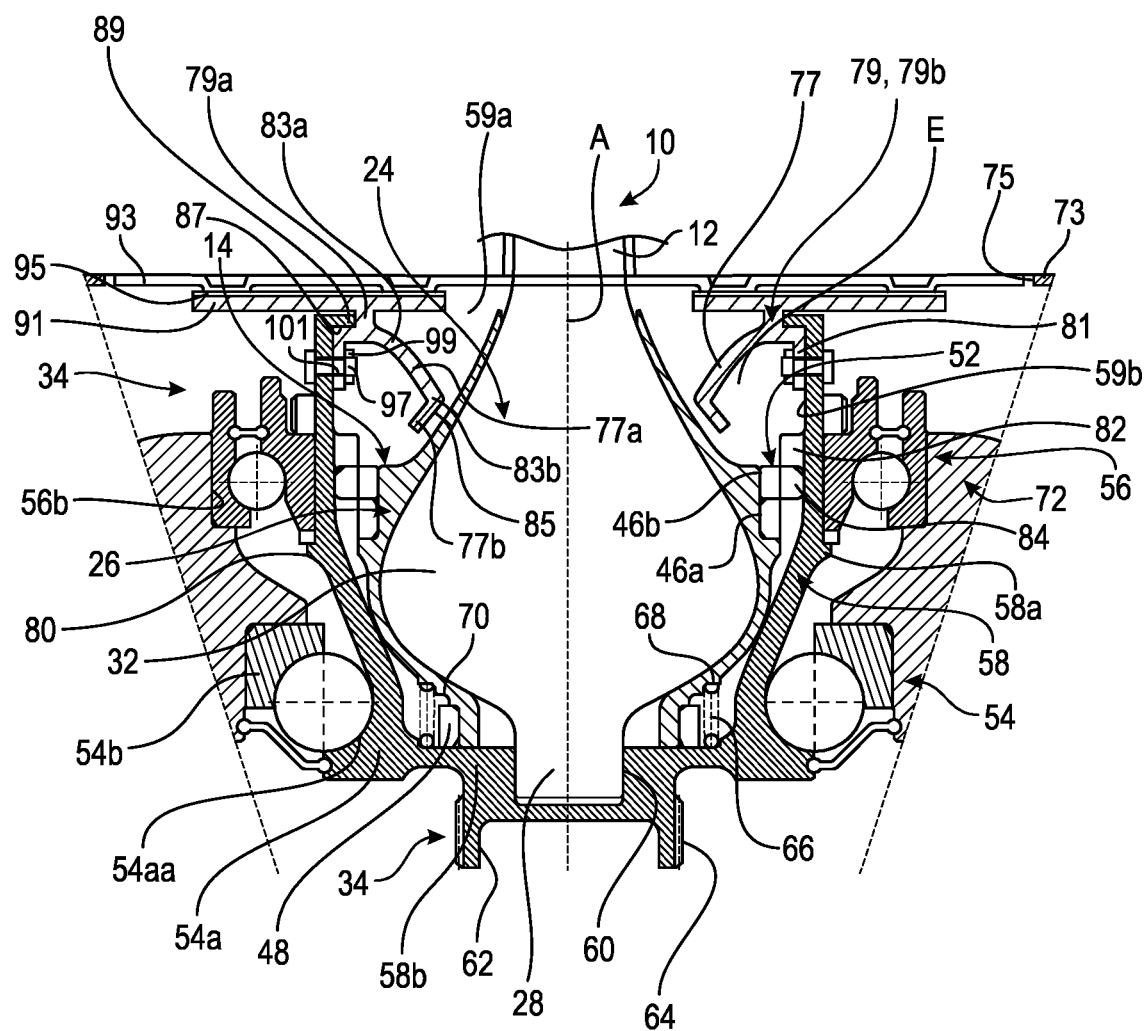
FIG. 8 is a schematic view in axial cross-section of the root of the vane of FIG. 1 and of an embodiment of a pitch setting system for this vane comprising a retention prong made according to a first embodiment the invention.

As shown in FIG. 8, the vane 10 is attached by its root 14 to a turbine engine hub 72 by means of a pitch setting system 34 which will be described in more detail later. The hub 72 is here an annulus that serves as a rotor disc. The hub 72 is equipped with an external casing 73 which constitutes an aerodynamic fairing of the hub 72. The casing 73 comprises an opening 75 for the vane 10 to pass through, so that the root 14 is housed within the casing 73 while the blade 12 extends radially outwards from the casing 73.

The root 14 comprises a body 24 which has a particular shape best seen in FIGS. 3 to 7. The body 24 comprises a bulb 32 which is connected to the blade 12 by a stretch radially narrower than the bulb 32, referred to as stilt 30. The body 24 is preferably solid, i.e. it has no hollow recessed portion.

In the embodiment shown in the figures, the root 14 comprises a metal cuff 26 which at least partly envelops the body 24, and in particular the bulb 32, as will be explained in more detail later.

The cuff 26 is preferably independent of the pitch setting system 34.

The root 14 is intended to be mounted in the hub 72 by means of the pitch setting system 34 which allows the vane 10 to pivot about its setting axis "A" with respect to the hub 72.

The pitch setting system 34 comprises a cup 58 comprising an annular wall 58a extending around the setting axis "A". The cup 58 serves as a pivot for the vane 10 relative to the hub 72. This wall 58a comprises a lower axial end closed by a bottom wall 58b, and an upper axial end open by a passage 59a radially delimited by an upper end edge 59b of the wall 58a. The wall 58a is flared from bottom to top to allow the root 14 of the vane 10 to be mounted inside the cup 58 by axial insertion in the direction of the setting axis "A". The cup 58 is made in one part.

The wall 58a of the cup 58 is delimited radially inwards by an internal face 59b.

An elastically deformable member 66, such as a helical spring, extends around the setting axis "A" and is mounted within the cup 58. This member 66 rests axially on the upper surface of the bottom wall 58b, at the external periphery of this surface in the example shown, and is configured to axially bias the root 14 of the vane 10 outwards of the cup 58, i.e. towards the side of the summit of the vane 10.

As can be seen in FIG. 8, the cup 58 is designed to be pivotally mounted about the setting axis "A" in the hub 72. In particular, it is designed to support bearings 54, 56 which ensure the centering and the guiding of the cup 58 about the setting axis "A" opposite the hub 72.

The bearings 54, 56 may form part of the pitch setting system 34. In particular, at least one of the guide bearings may have its internal ring which is integrated to the cup 58.

This is the case for the lower bearing 54 which has its internal ring 54a integrated into the cup 58. In practice, this means that the cup 58 comprises a raceway 54*a* at its external periphery on which the balls of the bearing 54 roll directly. This raceway comprises an annular surface with a concave curved section. This raceway is located at the lower end of the cup 58 and the wall 58*a*. The external ring 54*b* of the bearing 54 is attached to the casing 73, for example by shrink-fitting. Furthermore, the cup 58 is advantageously designed to apply a pre-stress to the bearing 54.

The external ring 56*b* of the bearing 56 is attached to the casing 73, for example by shrink-fitting. Its internal ring 56*a* is engaged on and around the free upper end of the cup 58 and of the wall 58*a*. This end of the wall 58*a* comprises an external cylindrical surface 76 for mounting the internal ring 56*a* as well as an external thread for screwing on a nut 78 intended to be supported axially on the internal ring 56*a* to maintain it tightened axially against an external cylindrical shoulder 80 of the cup 58.

The wall 58*a* of the cup 58 is flared outwards so that the bulb 32 is free to be inserted by sliding axially inwards of the cup 58. It is therefore necessary to provide an immobilisation member to axially attach the bulb 32 in the cup 58, and thus ensure the axial attachment of the vane 10 with respect to the hub 72. To this end, the cup 58 comprises in its internal face 59*b* means configured to cooperate with an immobilisation ring 52 forming said immobilisation member.

The immobilisation ring 52 extends around the setting axis "A" and is configured to be mounted around the root 14. This immobilisation ring 52 is configured to be mounted within the cup 58 and to cooperate respectively with the root 14 and the annular wall 58*a* of the cup 58 in order to ensure the axial retention of the root 14 in the cup 58.

Different embodiments of this immobilisation ring 52 will be detailed later.

The vane 10 is also secured in rotation to the cup 58. The bottom wall 58*b* is here configured to cooperate in a form-fitting manner with the free end of the root 14, and thus with a free end 28 of the body 24, so that the cup 58 is secured in rotation to the root 14 about the axis. In the present case, it is understood that the bottom wall 58*b* comprises a recess 60 having a non-circular, and in particular rectangular, cross-section and configured to receive the end 28 (FIG. 8).

According to the teachings of the invention, the pitch setting system 34 comprises a safety device for retaining the root 14 of the vane 10 inside the cup 58 when the immobilisation member, in particular the immobilisation ring 52, can no longer fulfil its attachment function. This safety device allows to prevent the vane 10 from colliding with the aircraft in the event of detachment.

To this end at least one retention prong 77 extends radially from the internal face 59*b* of the cup 58 into a radial space "E" reserved between the wall 58*a* of the cup 58 and the root 14. A stretch of the prong 77 is arranged axially opposite the bulb 32 thus restricting the passage section 59*a* of the cup 58 to retain the root 14 of the vane 10 inside the cup 58 in the event of failure of the member for immobilising the root 14 in the cup 58. In this way, when the root 14 is detached from the cup 58, it is subjected to a radially directed centrifugal force which tends to push it out of the cup 58. The prong 77 forms a restriction of the passage section 59*a* of the cup 58 which contacts the root 14. The centrifugal force exerted on the vane 10 is thus transmitted to the hub 72 by means of the prong 77 and the cup 58 to retain the vane 10 in the cup 58.

The prong 77 forms a point-like protrusion which, in one embodiment, does not extend circumferentially in a continuous manner around the setting axis "A".

Figure 21:
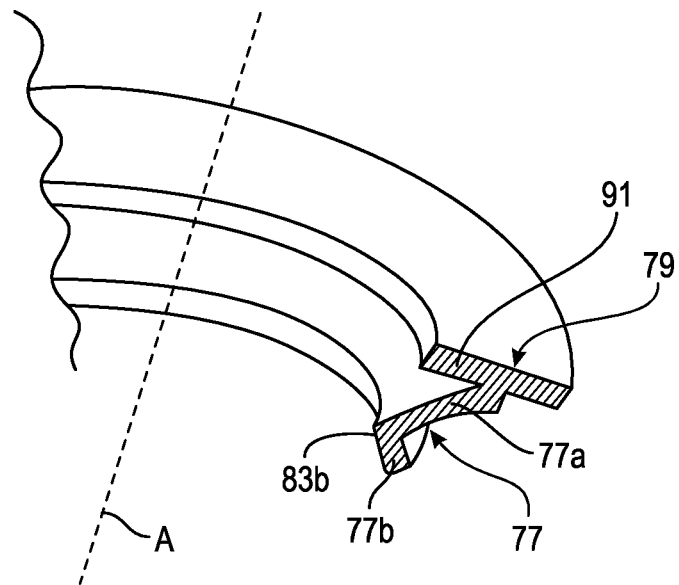
FIG. 21 is a perspective view with a partial axial cross-section which schematically represents a retention prong made according to a variant embodiment of the invention.

In an alternative embodiment of the prong 77 shown in FIG. 21, the prong 77 has the shape of a wall of revolution. The prong conformation 77 as hereinafter described being defined according to a cross-section in a plane which contains the setting axis "A".

Figure 22:
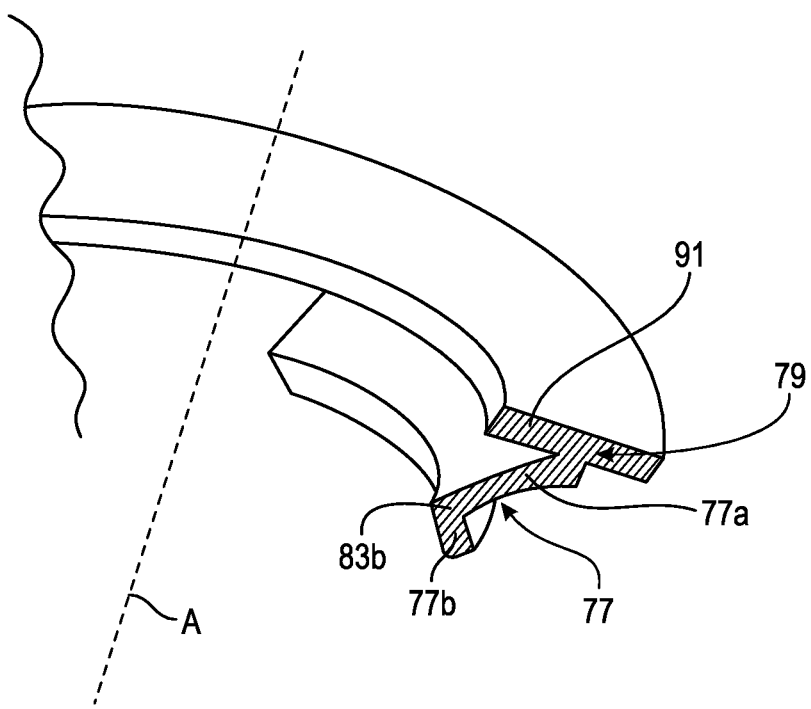
FIG. 22 is a similar view to FIG. 21, which shows another variant embodiment of the retention prong.

In another variant embodiment of the prong 77, which is shown in FIG. 22, the prong 77 is in the form of segment elements of a wall of revolution. The prong conformation 77 as hereinafter described being defined according to a cross-section in a plane which contains the setting axis "A".

As shown in FIG. 8, the prong 77 is made in one part with a support member 79 which is fitted and attached to the cup 58. The support member 79 comprises an axial attachment tab 81 which is attached against the internal face 59*b* of the cup 58 and from which the prong 77 extends radially. More particularly, the prong 77 extends radially from an upper end of the attachment tab 81.

In the embodiments shown in FIGS. 21 and 22, a plurality of attachment tabs are distributed at points around the prong 77 forming a wall of revolution or segment elements of wall of revolution. The segments shown in FIGS. 21 and 22 do not comprise any attachment tabs.

The attachment tab 81 is, for example, attached to the wall 58*a* of the cup 58 by means of a screw 97 and a nut 99 assembly. The nut 99 is for example made by crimping two rivets through the wall 58*a* of the cup 50 or through the attachment tab 81. For example, the nut 99 is mounted with a clearance in the plane of the wall through which it passes, the screw 97 allowing to carry out the attachment by clamping. The passage orifices 101 allowing the passage of the screw 97 have a diameter slightly larger than the diameter of the rod of the screw 97 in order to avoid shearing the screw 97 by maintaining the rod of the screw away from the edges of the orifices 101. The attachment is thus essentially carried out by tightening the screw 97 against the support.

The support member 79 is made of a metallic material such as steel, titanium or a titanium alloy, such as TA6V, inconel or aluminium.

The prong 77 is likely to bend to dampen a displacement of the root 14 of the vane 10 axially in the event of failure of the immobilisation member of the root 14 in the cup 58. Thus the kinetic energy of the vane 10 is converted into the deformation energy of the prong 77. More particularly, the prong 77 has a first elbow 83*a* at the level of its end for connection to the attachment tab 81. The prong 77 is likely to bend by deformation of this first elbow 83*a*.

In order to confer a greater flexibility on the prong 77, it has a main stretch 77*a*, which is here generally rectilinear, directed radially inwards from the attachment tab 81, and an end stretch 77*b*, which is here generally rectilinear, curved radially outwards to promote the deformation of the prong 77 in the event of axial displacement of the root 14 of the vane 10. In particular, the main stretch 77*a* is inclined towards the bottom of the cup 58. The end stretch 77*b* extends radially towards the wall of the cup 58 from its connecting end with the main stretch 77*a*. The end stretch 77*b* is also inclined towards the bottom of the cup 58 so as to extend substantially parallel to the axially opposing wall segment of the bulb 32. Thus, the prong 77 has a second elbow 83*b* which is arranged at the connection between the main stretch 77*a* and the end stretch 77*b*.

The prong 77 is intended to come into contact with the root 14 via a contact face 85 formed by the lower face of the end stretch 77*b*. The contact face 85 extends substantially parallel to the opposing wall segment of bulb 32. Thus, the contact face surface area 85 contacting the bulb 32 during an axial displacement of the vane 10 is large enough to withstand the pressure and retain the bulb 32 within the cup 58.

During an axial displacement of the vane 10, the bulb 32 of the root 14 thus bias the prong 77 by its contact face 85, causing the prong 77 to bend at the level of its first and its second elbows 83a, 83b. The impact with the root 14 is thus likely to be absorbed more effectively.

In particular, the prong 77 is elastically deformable at least over a portion of its flexion. For example, the prong 77 is elastically deformable over its entire bending movement.

Alternatively, the prong 77 is elastically deformable over a first portion of its bending movement, then the energy transmitted by the root 14 is absorbed by plastic deformation of the prong 77 over the end of its bending movement.

According to a first embodiment of the invention shown in FIG. 8, in the attached position of the root 14 of the vane 10 in the cup 58, the prong 77 is arranged axially at a distance from the projecting segment of the root 14. To prevent the vane 10 from gaining too much speed before the prong 77 slows it down in the event of a failure of the immobilisation ring, it is preferable that the axial distance between the prong 77 and the bulb 32 of the root 14 is reduced, for example to less than 2 mm.

Figure 7:
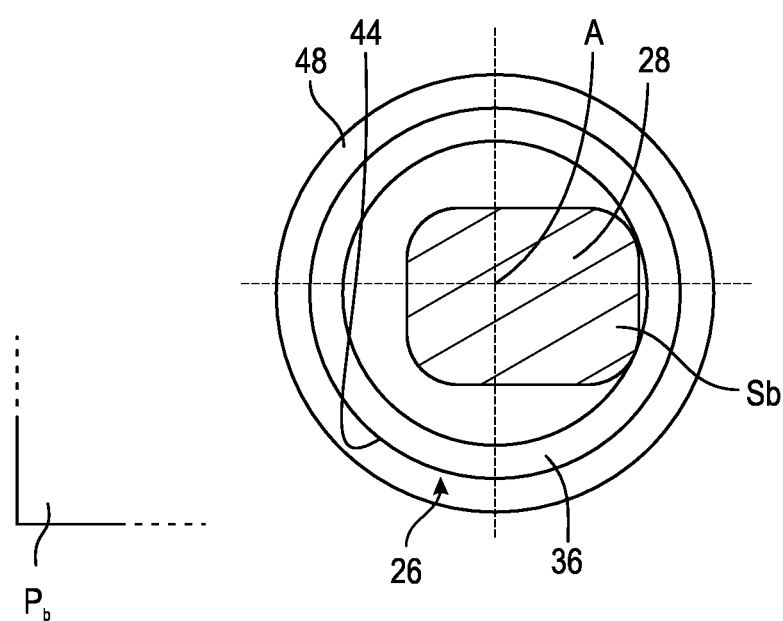
FIG. 7 is another schematic sectional view along the line VII-VII of FIG. 5.
Figure 19:
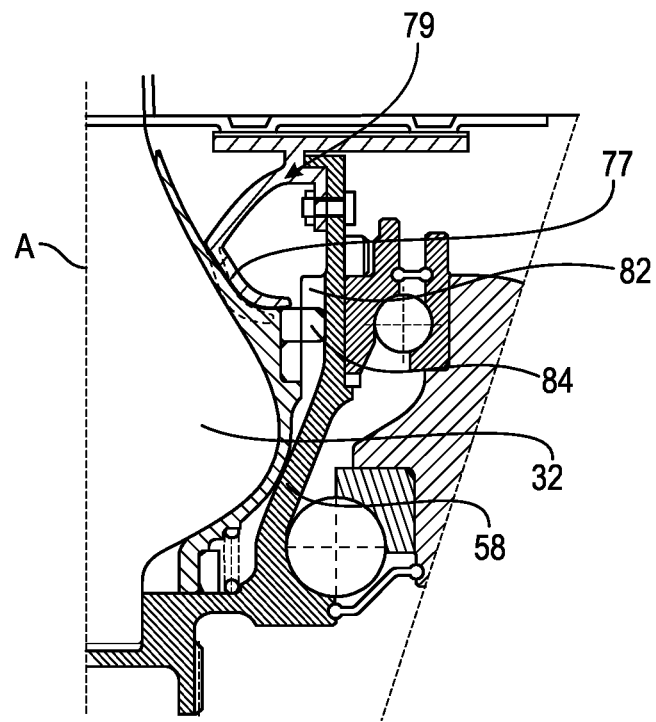
FIG. 19 is a half-view similar to FIG. 8 which shows a second embodiment of the retention prong.

According to a second embodiment of the invention shown in FIG. 19, in the attached position of the root 14 of the vane 10 in the cup 58, the prong 77 is arranged pre-stressed in bending against the projecting segment of the root 14. In FIG. 7, the rest position of the prong 77 is shown in dashed lines. It can be seen that the prong 77 is here pushed outwards and upwards against its elastic return force. This embodiment allows the prong 77 to absorb the kinetic energy of the vane 10 at the start of its axial displacement, before it has had a chance to gain speed.

In order to improve the damping when the vane 10 and the prong 77 come into contact, the contact face 85 of the prong 77 may be covered with a pad (not shown), for example of elastomeric material.

The support member 79 preferably comprises a plurality of prongs 77 which are evenly distributed around the root 14 of the vane 10 in order to distribute the forces.

To facilitate its arrangement in the cup 58, the support member 79 is formed of several separate sectors 79a, 79b, each of which is independently attached to the cup 58. Each sector 79a, 79b may be arranged in contact with two adjacent sectors 79a, 79b, or they may be arranged circumferentially spaced apart.

Each sector 79a, 79b is equipped with at least one prong 77 to allow the retention force of the vane 10 to be distributed around the cup 58.

When the support is formed of several distinct sectors 79a, 79b, each sector 79a, 79b is positioned radially by bearing against an annular segment of the internal face 59b of the cup 58. In addition, the cup 58 comprises at least one shoulder face 87 which extends radially inwardly from its internal face 59b to receive in axial support each sector 79a, 79b of the support member 79 upwards. More particularly, the upper end of the attachment tabs 81 is axially supported against the shoulder face 87. Thus, each sector 79a, 79b is positioned both radially and axially so that each prong 77 is correctly positioned relative to the bulb 32.

The shoulder face 87 is here formed by the lower face of a rim 89 which extends radially inwards from the upper end of the cup 58. As will be explained later, in some embodiments of the pitch setting system 34, it is necessary to provide a passage for inserting parts such as the immobilisation ring. In this case, the rim 89 does not extend continuously around the entire circumference of the cup 58, but is formed of discontinuous segment elements between which a space is reserved circumferentially for the insertion of said elements.

Advantageously, the support member 79 comprises a radial plate 91 for attaching a platform 93 which is intended to obturate the associated opening 75 of the casing 73 in order to give better aerodynamic performance to the propeller. The attachment plate 91 is arranged at an upper end of the attachment tab 81. Here it extends above the upper end of the cup 58 so as to be able to carry the platform 93, which generally obturates the entire opening 75. The plate 91 here extends radially from an internal end which is located in the vicinity of the stilt 30, perpendicular with the interior of the cup 58, to an external end which is located perpendicular with the exterior of the cup 58. The plate 91 extends just below the level of the casing 73 so that the platform 93 is flush with the outer face of the casing 73.

For example, the plate 91 has an annulus-shaped around the setting axis "A". The plate 91 is for example made in several segment elements to facilitate its arrangement around the root 14. Each segment element may have at least one prong 77.

Thus, the support member 79 serves not only as a safety device in case of failure of the immobilisation ring 82, but also as a support for the platform 93. This allows to reduce the number of parts that make up the propeller, reduces the weight of the propeller, and simplifies the assembly of the propeller.

The platform 93 can be made of metal or composite material.

To adjust the position of the platform 93 along the setting axis "A" so that it is flush with the outer face of the casing 73, wedges 95 can be interposed between the platform 93 and the plate 91.

The implementation of the invention is now described in two particular and non-limiting embodiments of the pitch setting system 34. In both of these embodiments, and as previously explained, the body 24 of the root 14 has a particular shape best seen in FIGS. 3 to 7.

The body 24 essentially comprises the three portions described above, namely:
- the free end 28 located on the opposite side to the blade 12,
- the stilt 30 located on the side of the blade 12, and
- the bulb 32 located between the free end 28 and the stilt 30.

The free end 28 has a generally parallelepiped shape in the example shown. As can be seen in FIG. 7, this end 28 is offset from the setting axis "A" to produce a keying or indexing, as will be explained in more detail below.

Figure 5:
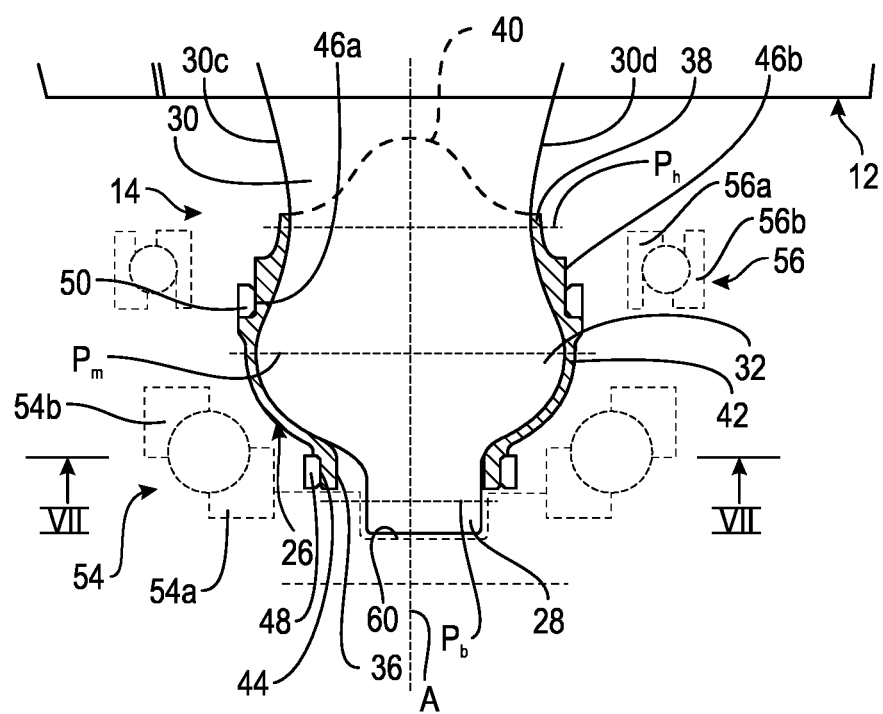
FIG. 5 is a further schematic axial sectional view of the root of the vane in FIG. 1 and guide bearings, the sectional plane extending along a chord of the blade of the vane.
Figure 6:
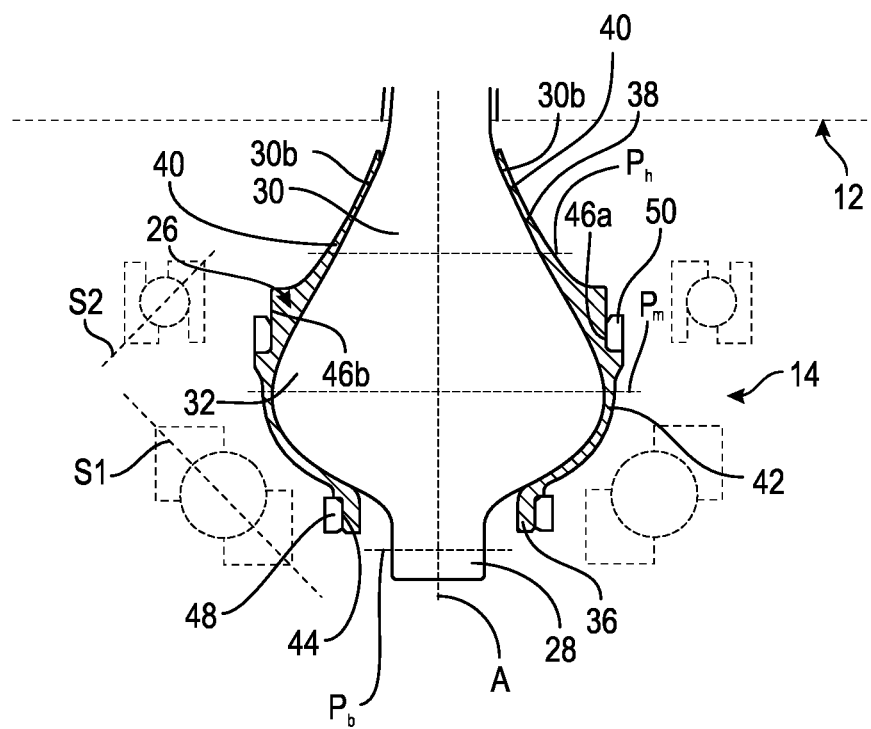
FIG. 6 is a schematic axial sectional view of the root of the vane in FIG. 1 and the guide bearings, with the sectional plane extending transversely to the chord of the blade of the vane.

As shown in FIGS. 5 and 6, Pb is defined as a transverse plane, i.e. a plane perpendicular to the setting axis "A", passing substantially through the middle of the end 28, measured along the setting axis "A". This plane Pb is referred to as bottom or lower plane. FIG. 7 shows the sectional shape of the end 28 in this plane Pb. This section, referred to as bottom section, has a value or an area, for example maximum, denoted Sb and is generally rectangular in shape in the example shown.

As will also be described in the following, the end 28 is configured to cooperate with a system 34 for setting the vane 10.

Figure 4:
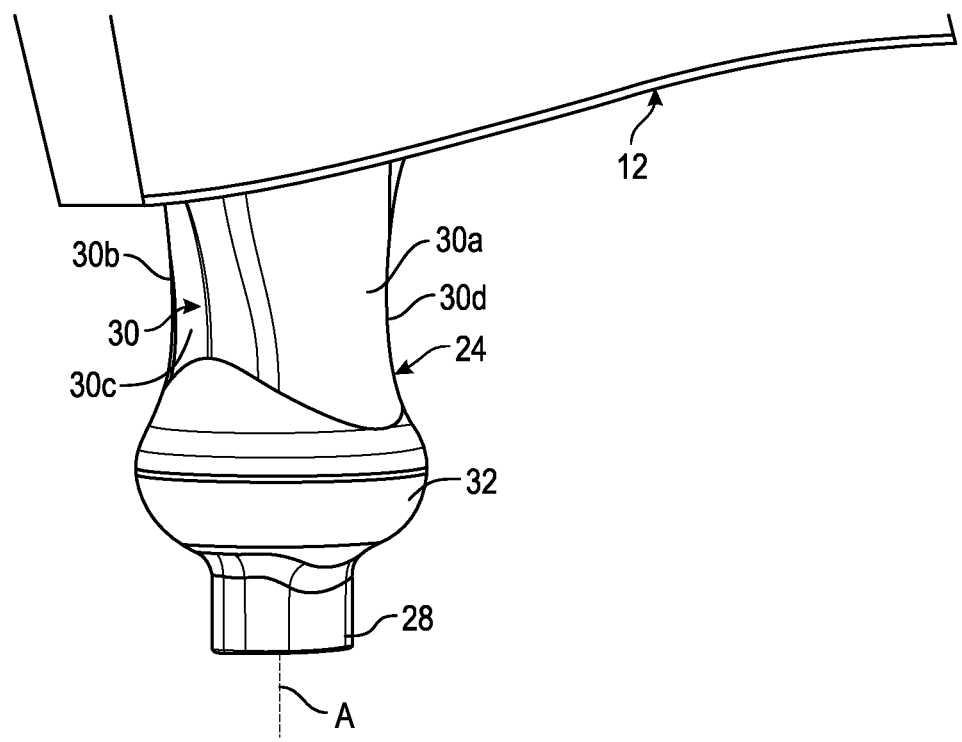
FIG. 4 is a schematic perspective view of the body of the root of the vane in FIG. 1.

The stilt 30 has a relatively complex shape and can be considered as comprising:
- two lateral flanks 30a, 30b, located respectively on the side of the intrados 12a and the extrados 12b of the blade 12, which converge towards each other along the setting axis "A" and in the direction of the summit of the blade 12 (cf. FIGS. 4 and 6), and two edges, respectively upstream 30c and downstream 30d, which on the contrary diverge from each other along the setting axis "A" and in the direction of the summit of the blade 12 (see FIGS. 4 and 5).

Ph is defined as a transverse plane passing through the stilt 30, and in particular its lower end. This plane Ph is referred to as high or upper plane. In this plane, the stilt may have a non-circular shape in section, for example oval, oblong, square or rectangular. This section, referred to as high section, has a value or a surface area, for example maximum, noted Sh.

The bulb 32 has a generally bulging or domed shape, this bulge or doming extending around the setting axis "A".

Pm is defined as a median plane passing through the bulb 32, and in particular in its largest cross-sectional portion, which is denoted Sm. This plane Pm is referred to as mean plane. In this plane, the bulb 32 may have a circular shape in section shape, although this section is not limiting.

It is understood that the Pm plane is located between the planes Pb and Ph. The cross-section of the bulb 32 decreases from the plane Pm (Sm) to the plane Ph, and from the plane Pm towards the plane Pb. It is therefore understood that Sm is superior to Sb and Sh. Furthermore, in the example shown, Sh is greater than Sb.

Figure 3:
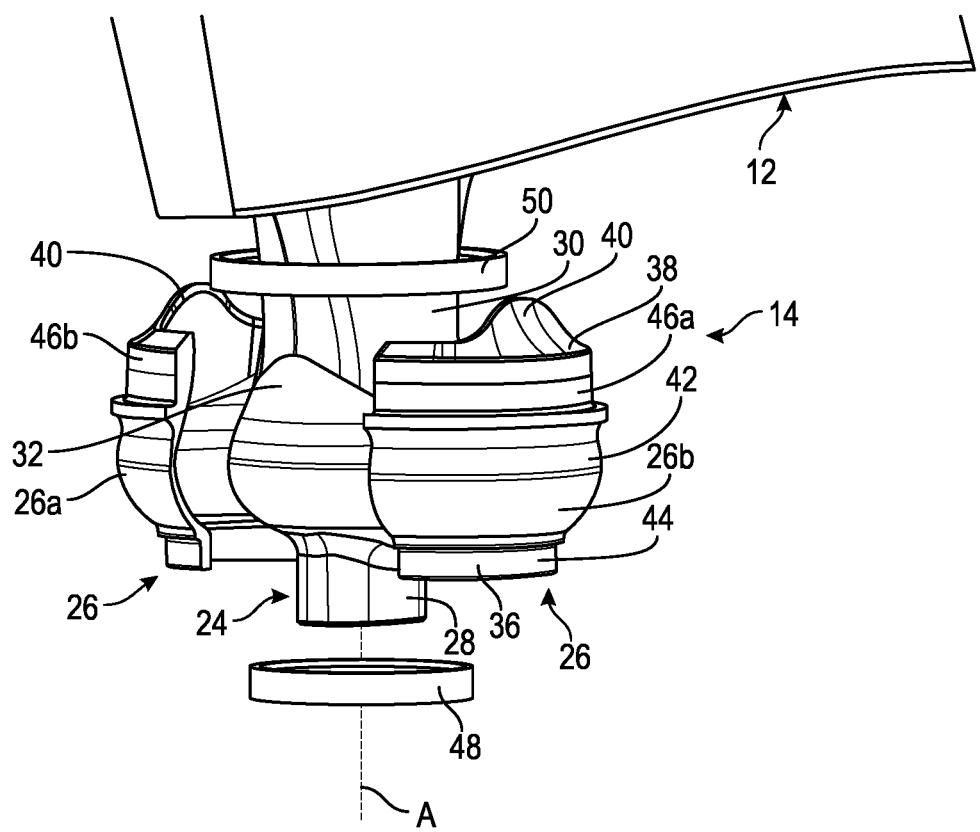
FIG. 3 is a schematic perspective view with partial exploded view of the root of the vane in FIG. 1.

The cuff 26 is here made of two half-shells 26a, 26b, as can be seen in FIG. 3, which are fitted and attached to the body 24, for example one on the side of the intrados 12a of the blade 12 and the other on the side of the extrados 12b of the blade 12. The half-shells 26a, 26b are thus joined at the level of a joint plane which passes through the setting axis "A" and which extends substantially parallel to a chord of the blade 12.

The cuff 26 is advantageously attached to the body 24, preferably by gluing. The glue extends between the cuff and the body 24, all around the setting axis "A".

The cuff 26 is preferably metallic (steel, titanium or titanium alloy such as TA6V). The glue is, for example, an epoxy glue filled with thermoplastic or elastomeric nodules or reinforced with a fabric. This gluing assembling method is particularly suitable due to the large contact surface area between the cavity of the cuff and the body 24, which can be composite. The presence of a glue seal is advantageous because it allows slight form defects to be corrected. The glue seal also allows to prevent the friction at the metal/composite interface and thus increases the service life of the vane 10.

Several possibilities are envisaged for fitting the cuff 26 to the body 24. A first possibility is to deliberately leave a clearance between the two half-shells 26a, 26b of the cuff 26 once they have been fitted, so that the pressure can be properly applied when the glue seal cures. The curing phase can be carried out in an autoclave with the entire vane 10 inside a vacuum bag. However, it is also possible to carry out this operation in a press. However, the disadvantage of leaving a clearance between the two half-shells 26a, 26b is that their positioning is less controllable and therefore a rework of the external surface must be carried out.

A second possibility is to fit the half-shells one against the other around the body 24 without any existing clearance. This strategy is possible, for example, by machining a blank that has already been cut into two portions and maintained together during the machining operation in order to ensure the geometry of the external surfaces once the half-shells are reassembled. This allows the positioning and the geometry of the external surface of the cuff 26 to be controlled without the need for additional machining after gluing. In any case, positioning pins or stops can be considered to ensure the relative position of the half-shells of the cuff.

However, the presence of a glue seal between the body 24 and the cuff is not mandatory, although it is very advantageous. Alternatively, pre-stressing washers (or springs) can be used between the cuff and the composite body 24 in order to push the body 24 radially against the bearing surfaces of the cuff. The geometry of the cuff can also be used to slightly "clamp" the body 24 when the two half-shells of the cuff are fitted around the bulb 32. In this case, it is the deformation of the cuff that generates a pre-stress. A tooling must therefore be provided to maintain this position before final assembly.

As can be seen in FIGS. 5 and 6, the cuff 26 covers and conforms to at least a portion of the bulb 32 and of the stilt 30, and has a complementary shape in section of the bulb 32 at the level of the middle section Sm, and of the stilt 30 at the level of the high section Sh.

More specifically, the cuff 26 comprises three portions in the example shown:

a lower end 36 which is generally annular in shape (see FIGS. 5-7) and extends at the level of and around the free end 28 of the root 14, an upper end 38 which extends at the level of the plane Ph and which comprises two lateral lips 40 applied to the flanks 30a, 30b of the stilt 30, and a middle portion 42 applied to the bulb 32 and closely conforming its shape.

The lips 40 are supported on the flanks 30a, 30b of the stilt 30 and allow to stiffen the root 14 of the vane 10 and to reinforce its resistance to torsion about the setting axis A.

In addition, they allow energy to be absorbed in the event of an impact on the vane 10, such as the ingestion of a bird. Fillets may be present on these lips to prevent local wear or damage to the body 24.

The internal surfaces of the cuff 26 that are in contact with the body 24 serve as bearing surfaces. Compared to a pinned attachment, the bearing surface is maximized by exploiting the entire circumference of the bottom of the vane 10. In a pinned attachment, only two distinct surfaces of the root 14 of vane 10, respectively located on the intrados and the extrados, are supported on bearing surfaces, whereas the surfaces of the root 14 of vane 10 located on the leading edge and trailing edge are free. Also in comparison to a pinned attachment, the height of the bearing surfaces in the radial direction is much greater, which also contributes to a considerable increase in their surface area. This large support surface allow to reduce the contact pressure in all operating conditions.

The cuff 26 comprises two cylindrical surfaces 44, 46a for mounting shrink-fitting rings 48, 50. The shrink-fitting rings 48, 50 allow to maintain the half-shells 26a, 26b tightened one against the other and to the body 24. The shrink-fitting rings 48, 50 extend around the setting axis "A".

The surface 44 is located on the lower end 36 and is oriented radially outward with respect to the setting axis "A". It receives the ring 48 by shrink-fitting, which is engaged from below and is supported axially on a cylindrical bearing surface located at the junction of the end 36 and of the middle portion 42 of the cuff 26.

The surface 46a is located on the middle portion 42 and is oriented radially outwards with respect to the setting axis "A". It receives the ring 50 by shrink-fitting, which is engaged from above and is supported axially on a cylindrical bearing surface located near the plane Pm.

It can be seen that the surface 46a is located immediately adjacent to a cylindrical surface 46b which is intended to receive an immobilisation ring 52, as will be described in the following.

The surfaces 44, 46a and the rings 48, 50 have different diameters in the example shown. The surface 46a has a larger diameter than that of the surface 44 and therefore the ring 50 has a larger diameter than that of the ring 48.

The surfaces 46a, 46b may have the same or different diameters. The surface 46b may for example have a slightly smaller diameter than that of the surface 46a. This is in particular the case where the ring 50 should be mounted with a predetermined radial clearance with respect to this surface 46b.

It can be seen from FIGS. 5 and 6 that the ring 50 is located between the planes Ph and Pm, and the ring 48 is located between the planes Pm and Ps.

FIGS. 5 and 6 also show the position of the rings 48, 50 and the planes Pm, Ph, Ps in relation to rolling bearings 54, 56 which extend around the setting axis "A" and the root 14.

The bearings 54, 56 are here two in number and are a lower bearing 54 and an upper bearing respectively.

The bearings 54, 56 are of the ball rolling type. In the example shown, they have different diameters and their balls also have different diameters.

The bearing 54 extends substantially between the planes Pm and Pb and thus around a lower portion of the bulb 32. It also extends around the ring 48. This bearing 54 has a smaller diameter than the other bearing 56, and theirs balls have a larger diameter than those of the other bearing 56.

The bearing 54 is also angular contact. In the example shown, the bearing points or surfaces of the balls on the raceways of their rings 54a, 54b are located on a frustoconical surface S1 which extends along the setting axis "A" and whose largest diameter is located on the side of the summit of the vane 10.

The bearing 56 extends substantially between the planes Pm and Ph and thus around an upper portion of the bulb 32. It also extends around the ring 50. The bearing 56 is also angular contact. In the example shown, the bearing points or surfaces of the balls on the raceways of their rings 56a, 56b are located on a frustoconical surface S2 which extends along the setting axis "A" and whose largest diameter is located on the side of the free end of the root 14 of the vane 10.

The position of the middle section between the two bearings 54, 56 is very advantageous in terms of radial overall dimension because a portion of the bearing surface height between the middle and high sections is located inside the cup 58, unlike the prior art on pinned attachment integrated in a pivot. This helps to reduce the radial overall dimension of the setting system 34.

Figure 16:
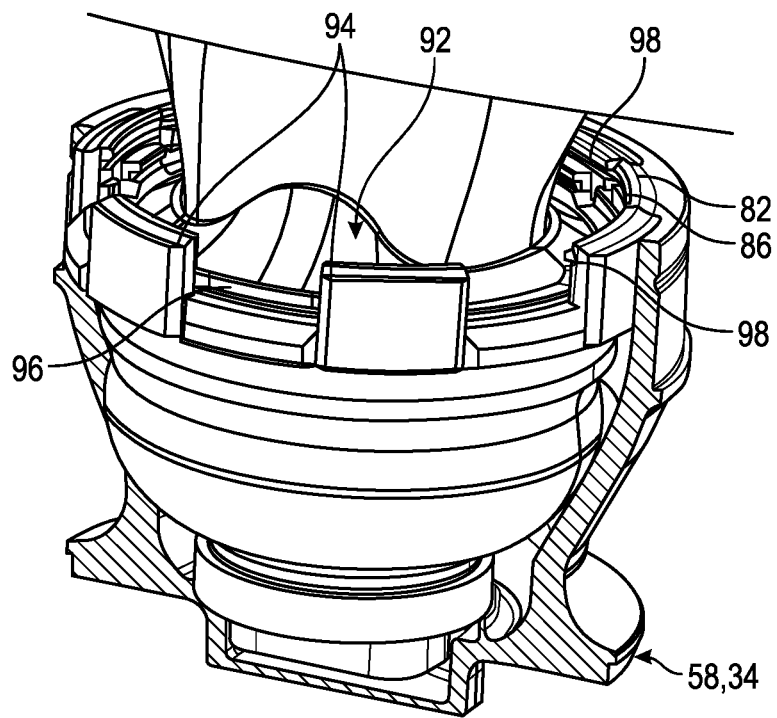
FIG. 16 is a schematic perspective view in partial axial cross-section of the root of the vane and of the system of FIG. 8, and shows a fifth mounting step.
Figure 17:
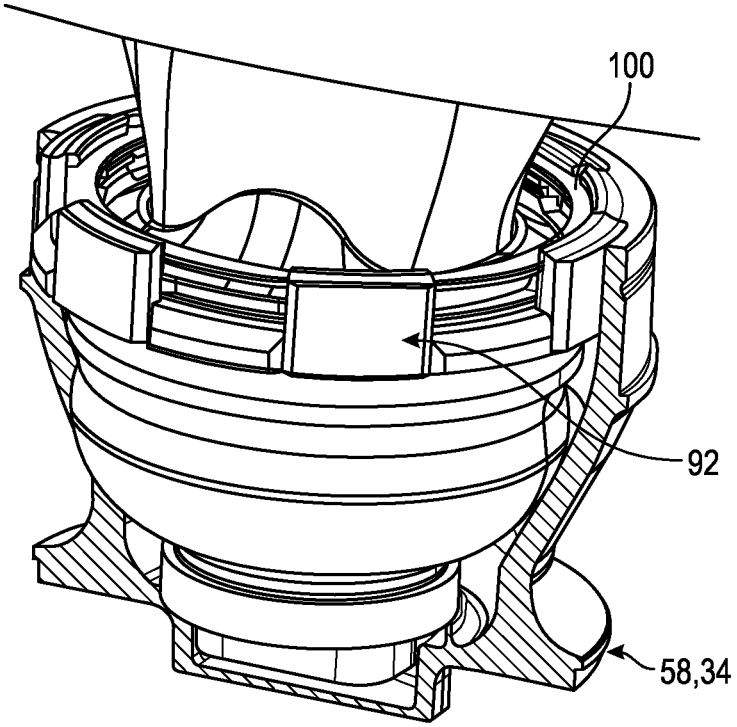
FIG. 17 is a schematic perspective view in partial axial cross-section of the root of the vane and of the system of FIG. 8, and shows a sixth mounting step.
Figure 18:
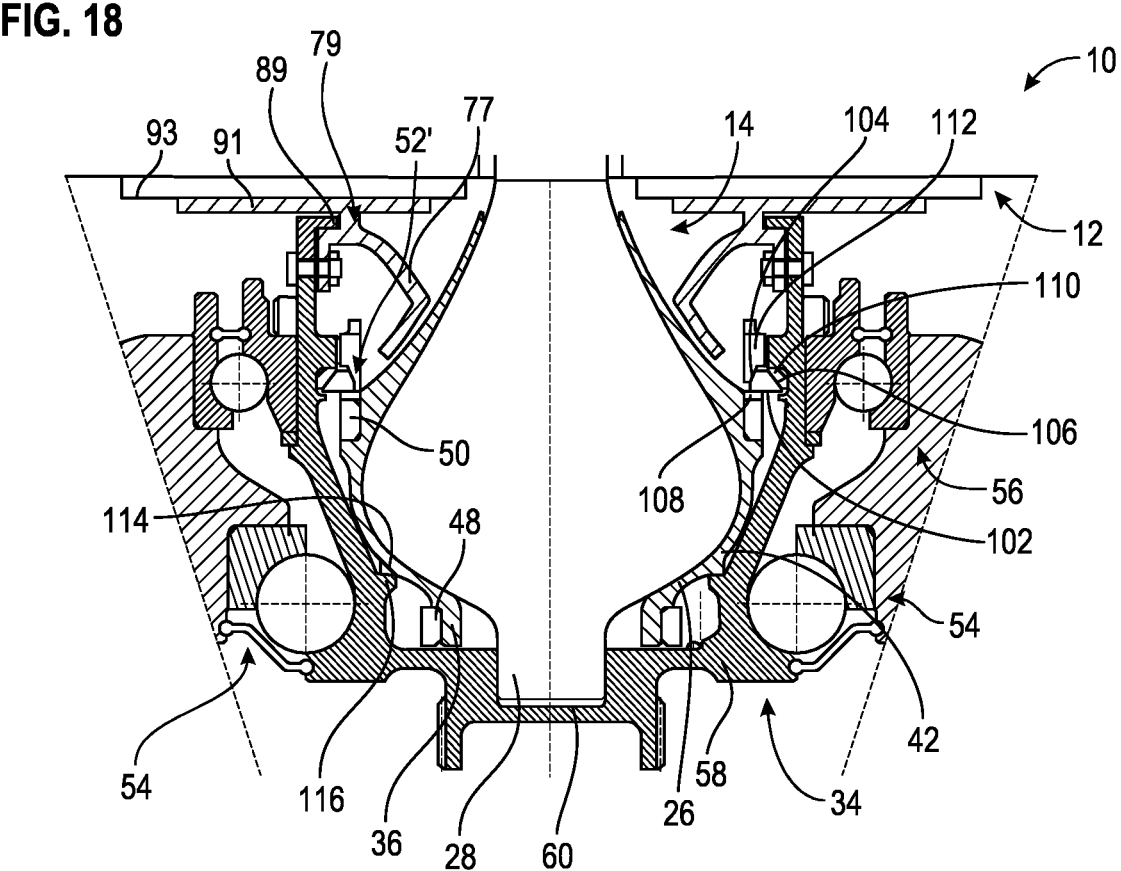
FIG. 18 is a schematic view in axial cross-section of the root of the vane of FIG. 1 and of a variant embodiment of a pitch setting system for this vane comprising a retention prong made according to the first embodiment of the invention.

FIGS. 8 to 17 illustrate a first embodiment of the pitch setting system 34 and in particular of the immobilisation ring 52, and FIG. 18 illustrates an alternative embodiment of the pitch setting system 34 and of this ring.

The pitch setting system 34 comprises a cup 58 comprising an annular wall 58a extending around the setting axis "A". This wall 58a comprises a lower axial end closed by a bottom wall 58b, and an upper axial end open and configured to allow the mounting of the root 14 of the vane 10 within the cup 58.

The bottom wall 58b is configured to cooperate in a form-fitting manner with the free end of the root 14, and thus with the end 28 of the body 24, so that the cup 58 is secured in rotation to the root 14 about the axis.

In the present case, it is understood that the bottom wall 58b comprises a recess 60 having a non-circular, and in particular rectangular, cross-section and configured to receive the end 28 (FIG. 8). As can be seen in FIG. 5, this recess 60 is eccentric with respect to the setting axis "A" in a similar manner to the end 28 (see FIG. 7). This eccentricity allows an indexing and a keying when inserting and mounting the root 14 into the cup 58, with only one engagement position of the end 28 in the recess 60 being possible.

The recess 60 is located on an upper or internal face of the bottom wall 58b of the cup 58, which is thus located inside the cup 58 and oriented on the side of the root 14.

The pitch setting system 34 generates a torque at the root 14 of vane 10 which counteracts the torsional moment resulting from aerodynamic and centrifugal forces. The end 28 of the root 14 could be enveloped in the cuff 26, like the rest of the body 24 of the root 14. In this case, it would also have a non-circular shape to constrain its rotation. However, it is advantageous to let this end of the body 24 protrude from the cuff, as mentioned above, in order to directly force the rotation of the body 24. This provides a more direct force path, with the torsional moment applied directly to the body 24. The bottom section has dimensions strictly smaller than the maximum dimension of the middle section in order to limit the circumferential overall dimension to this height. As a result, the cuff also has a smaller circumferential overall dimension at this height than at the level of the middle section. This allows to reduce the diameter of the lower bearing which is below the middle section. Thus, the root 14 of vane 10 can be integrated lower radially, which greatly reduces the theoretical hub ratio associated with the integration of the root 14. It is known to the person skilled in the art that a low hub ratio improves the performance of the engine, in particular as it is more compact and therefore lighter. This last point is a very important advantage of the technical solution compared to the competition, which traditionally proposes cuffs with a cylindrical external shape.

The bottom wall 58b comprises a lower or external face, which is located on the opposite side of the root 14, and which comprises a cylindrical extension 62 extending along the setting axis "A" and comprising an external thread or external straight splines 64 for the rotational coupling of the pitch setting system 34 with a pitch change mechanism which is not illustrated and which is common to the different pitch setting systems 34 and vanes 10 of the propeller.

An elastically deformable member 66, such as a helical spring, extends around the setting axis "A" and is mounted within the cup 58. This member 66 rests axially on the upper surface of the bottom wall 58b, at the external periphery of this surface in the example shown, and is configured to axially bias the root 14 of the vane 10 outwards of the cup 58, i.e. towards the side of the summit of the vane 10.

The member 66 is supported on a cylindrical bearing surface 68 of the cuff 26. In the example shown, the member 66 is centered by engaging its upper end on and around a cylindrical rim 70 of the cuff, and by engaging its lower end on and around a cylindrical rim of the cup 58 located at the external periphery of the bottom wall 58b.

The member 66 here extends around the shrink-fitting ring 48.

As can be seen in FIG. 8, the cup 58 is designed to support the bearings 54, 56 which ensure the centering and the guiding of the cup 58 about the setting axis "A" opposite the hub 72.

The bearings 54, 56 may form part of the pitch setting system 34. In particular, at least one of the guide bearings may have its internal ring which is integrated to the cup 58.

This is the case for the lower bearing 54 which has its internal ring 54a integrated into the cup 58. In practice, this means that the cup 58 comprises a raceway 54aa at its external periphery on which the balls of the bearing 54 roll directly. This raceway comprises an annular surface with a concave curved section. This raceway is located at the lower end of the cup 58 and of the wall 58a. The external ring 54b of the bearing 54 is attached to the hub 72, for example by shrink-fitting. Furthermore, the cup 58 is advantageously designed to apply a pre-stress to the bearing 54.

The external ring 56b of the bearing 56 is attached to the hub 72, for example by shrink-fitting. Its internal ring 56a is engaged on and around the free upper end of the cup 58 and of the wall 58a. This end of the wall 58a comprises an external cylindrical surface 76 for mounting the internal ring 56a as well as an external thread for screwing on a nut 78 intended to be supported axially on the internal ring 56a to maintain it tightened axially against an external cylindrical shoulder 80 of the cup 58.

The wall 58a of the cup 58 further comprises in its internal face 59b means configured to cooperate with the aforementioned immobilisation ring 52.

The immobilisation ring 52 extends around the setting axis "A" and is configured to be mounted around the root 14. This immobilisation ring 52 is configured to be mounted within the cup 58 and to cooperate respectively with the root 14 and the annular wall 58a of the cup 58 in order to ensure the axial retention of the root 14 in the cup 58.

In the embodiment of FIGS. 8 to 17, this immobilisation ring 52 is a dogging ring which comprises external dog teeth 84 configured to cooperate with complementary internal dog teeth 82 of the annular wall 58a of the cup 58.

Figure 9:
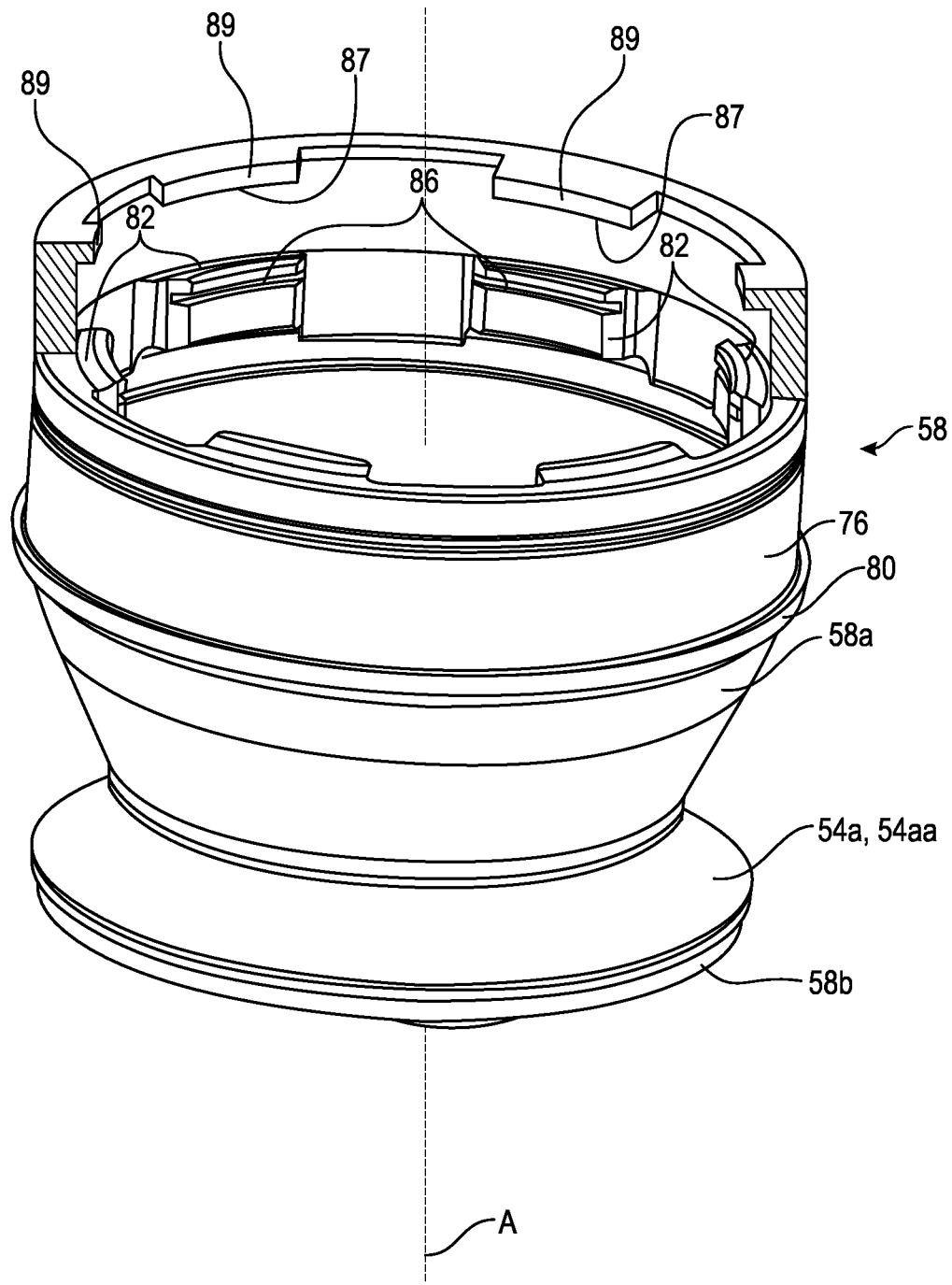
FIG. 9 is a schematic perspective view of a cup of the system in FIG. 8.

The teeth 82 of the cup 58 are best seen in FIG. 9. These teeth are evenly spaced around the setting axis "A". There are six in the non-limiting example shown. For example, they each have an angular extension about the setting axis "A", of between approximately 20 and 30°.

Each of the teeth 82 comprises a groove 86 on its internal periphery which is circumferentially oriented with respect to the setting axis "A". The grooves 86 in the teeth 82 form a discontinuous gorge around the setting axis "A".

Figure 10:
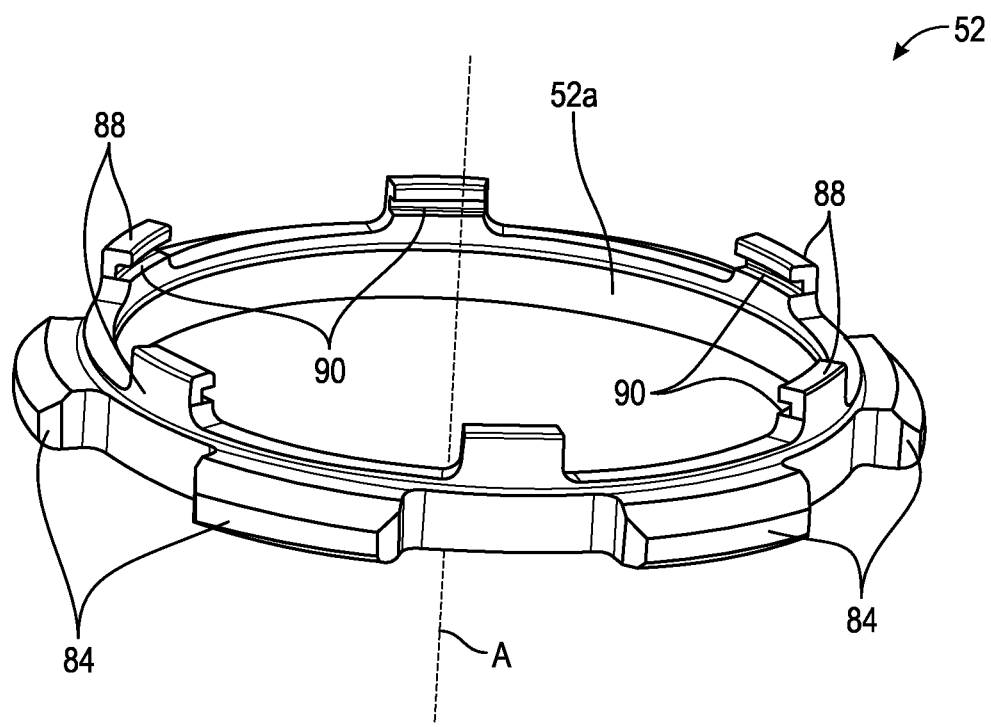
FIG. 10 is a schematic perspective view of a dogging ring of the system in FIG. 8.

The dogging ring is best seen in FIG. 10. Its teeth 84 are evenly spaced around the setting axis "A". There are six in the non-limiting example shown. For example, they each have an angular extension about the setting axis "A", of between approximately 20 and 30°.

The teeth 84 are complementary to the teeth 82 and are configured to cooperate by dogging with these teeth 82. The dogging is a well-known method of mounting in the aeronautical field and will be illustrated by FIGS. 12 to 17 showing a mounting method.

As explained above, and as shown in FIG. 9, in this case the rim 89 of the cup 58 is formed in segment elements which are circumferentially spaced from each other so as to allow the passage of the teeth 84 of the ring 52. The segment elements of the rim 89 are not necessarily arranged in coincidence with the teeth 82 of the cup 58, they may be angularly offset. This allows, for example, to provide a means for retaining the ring 52 within the cup 58 in the event of accidental removal of the ring 52. In FIGS. 12 to 17, the portion of the cup 58 comprising the rim 89 has not been shown to allow a better view and explanation of the operation of the pitch setting system 34.

The ring 52 comprises an internal cylindrical surface 52a intended to cooperate by sliding with the aforementioned surface 46b of the cuff 26.

The ring 52 comprises a second set of teeth 88, which extend axially upwards on the side of the summit of the vane 10 from an upper face 89 of the ring 52. These teeth 88 are also evenly spaced around the setting axis "A". There are six of them in the example shown. They may be staggered in relation to the teeth 84, i.e. the teeth 88 are axially aligned with the circumferential spaces between the teeth 84. As a non-limiting example, the teeth 88 each have an angular extension around the setting axis "A", of between approximately 10 and 20°.

Each of the teeth 88 comprises at its internal periphery a groove 90 oriented circumferentially with respect to the setting axis "A". The grooves 90 in the teeth 88 form a discontinuous groove around the setting axis "A".

Figure 11:
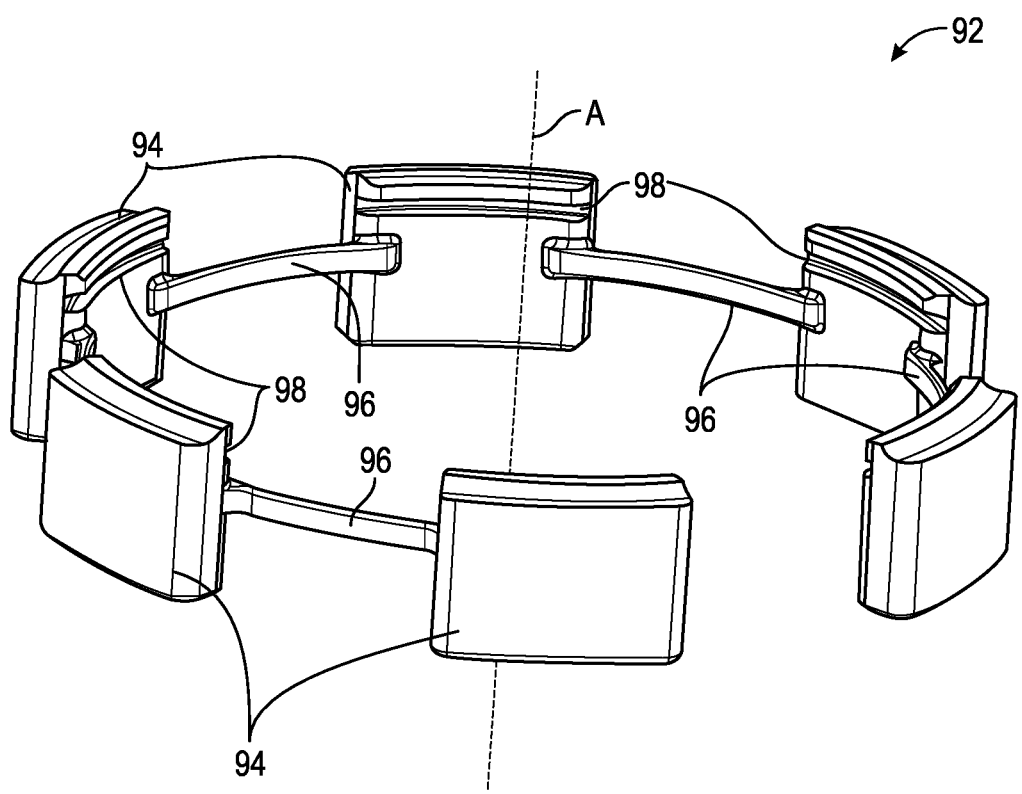
FIG. 11 is a schematic perspective view of a locking annulus for the system in FIG. 8.

FIG. 11 shows a locking annulus 92 which is configured to be axially engaged between the dog teeth 82, 84 to prevent the rotation of the ring 52 within the cup 58.

This annulus 92 comprises skids 94, here six in number in the non-limiting example shown, intended to be engaged in the inter-tooth spaces extending between the teeth 82 and 84. It is therefore understood that these skids 94 have complementary shapes to those of these spaces and are evenly spaced around the setting axis "A".

In the example shown, the skids 94 are secured to each other by bridges 96 extending circumferentially between the skids 94. The bridges 96 are five in number and each extend between two adjacent skids 94. Two of the skids 94 are deliberately not connected together by a bridge so that the annulus 92 is open. This can simplify the mounting by moving these skids apart or towards each other, when mounting the annulus in the pitch setting system 34.

Each of the skids 94 comprises a groove 98 at its internal periphery, which is circumferentially oriented with respect to the setting axis "A". The grooves 98 in the skids 94 form a discontinuous gorge around the setting axis "A".

The pitch setting system 34 further comprises an annular snap ring 100 which is only visible in FIG. 17.

The snap ring 100 is mounted in the cup 58 to axially block the locking annulus 92 in the cup 58. The snap ring 100 may also be split or open to facilitate its mounting and is intended to be engaged in the grooves 86 of the teeth 82 of the cup 58 as well as the grooves 98 of the skids 94 of the annulus 92, when these grooves 86, 98 are all located in a same plane perpendicular to the setting axis "A" and are arranged circumferentially with respect to each other to form a complete gorge around the setting axis "A" (cf. FIGS. 16 and 17).

Reference is now made to FIGS. 12 to 17 which illustrate a method for mounting the assembly formed by a vane 10 as shown in FIG. 1 and a pitch setting system 34 as shown in FIG. 8.

Figure 12:
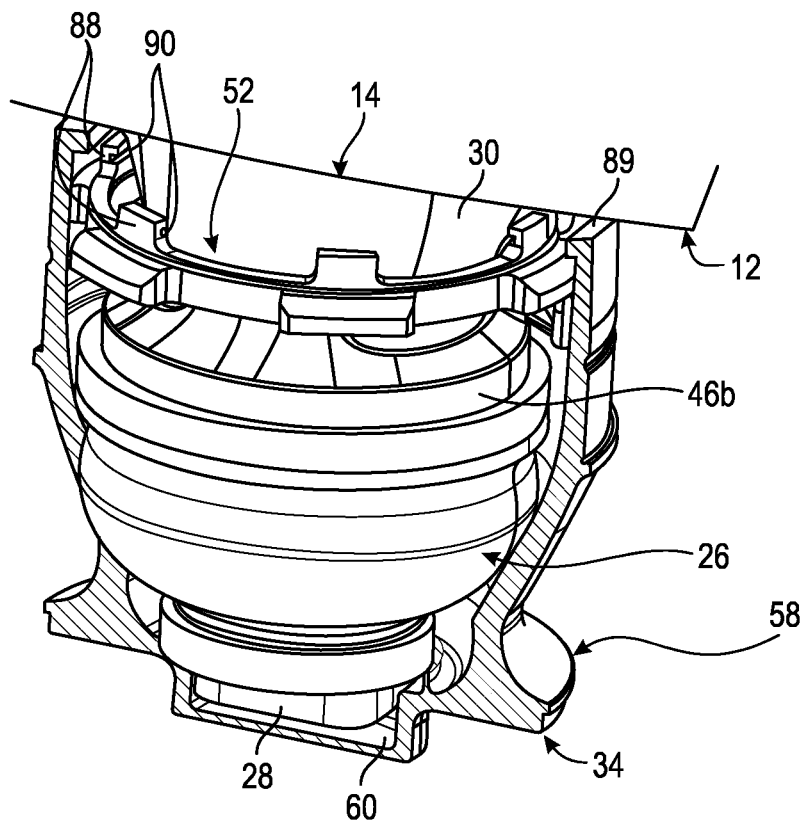
FIG. 12 is a schematic perspective view in partial axial cross-section of the root of the vane and of the system of FIG. 8, and shows a first step of mounting, with the upper portion of the cup being cut off to allow a better view of the interior of the cup.

In the first step illustrated in FIG. 12, the root 14 of the vane 10 is engaged in the cup 58 of the pitch setting system 34 by axial translation along the setting axis "A", until the end 28 of the body 24 of the root 14 engages in the recess 60 of the cup 58. As can be seen in the drawing, the shrink-fitting ring is already mounted captive around the stilt 30 of the body 24 of the root 14. Although not shown in this figure, the member 66 (FIG. 8) is compressed when the root 14 is inserted into the cup 58.

Figure 13:
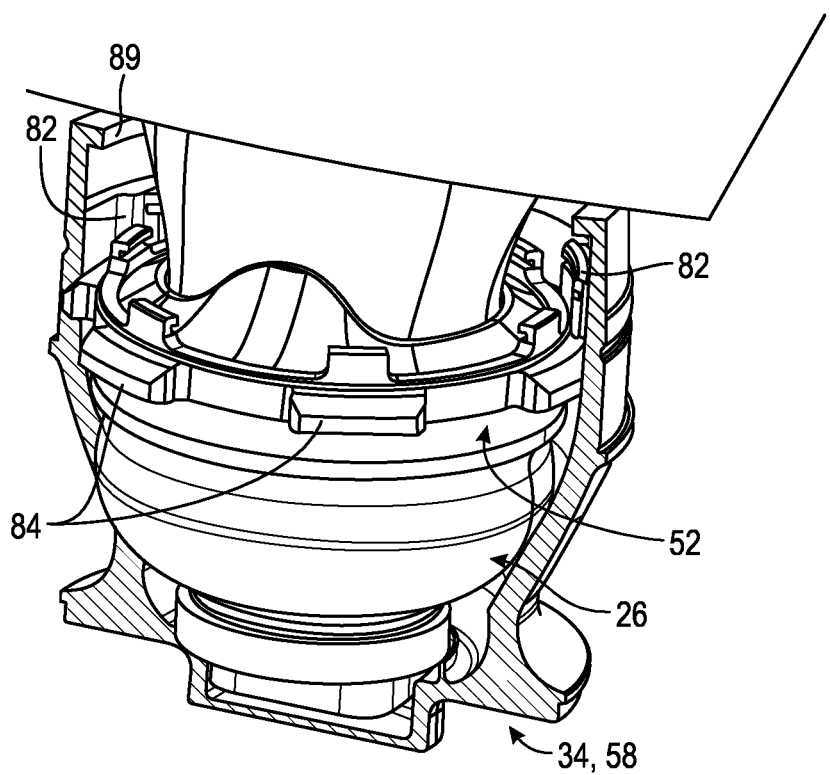
FIG. 13 is a schematic perspective view in partial axial cross-section of the root of the vane and of the system of FIG. 8, and shows a second mounting step.

In the second step illustrated in FIGS. 12 and 13, the shrink-fitting ring is angularly positioned about the setting axis "A" so that its teeth 84 are aligned with the teeth 82 of the cup 58. The ring 52 is then displaced in axial translation within the cup 58 until the ring 52 is engaged on the surface 46b of the cuff 26 and the teeth 84 are located just below the teeth 82, as shown in FIG. 13. The grooves 90 provided on the teeth can be used to grip the ring 52 with a suitable tool.

Figure 14:
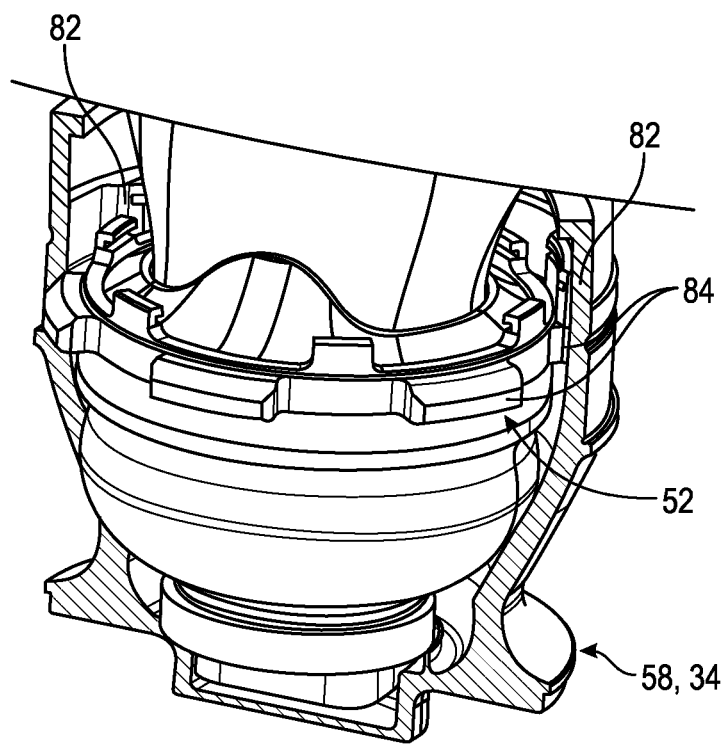
FIG. 14 is a schematic perspective view in partial axial cross-section of the root of the vane and of the system of FIG. 8, and shows a third mounting step.

In the third step illustrated in FIGS. 13 and 14, the ring 52 is displaced in rotation about the setting axis "A" so that these teeth 82, 84 are axially aligned with each other. Due to the angular extension of the teeth in the example shown, this angular displacement is in the order of 25-30°. The teeth 88 can be used to grip the ring 52 and rotate it by the aforementioned tool. The member 66, not shown, biases the root 14 axially outwards from the cup 58, causing the teeth 84 to rest axially on the teeth 82. The root 14 is thus maintain axially within the cup 58 and the pitch setting system 34. In operation, the centrifugal forces applied to the vane 10 are transmitted by the teeth 82, 84 to the cup 58, these forces being directly taken up by the bearing 54 whose internal ring 54a is integrated into the cup 58.

Figure 15:
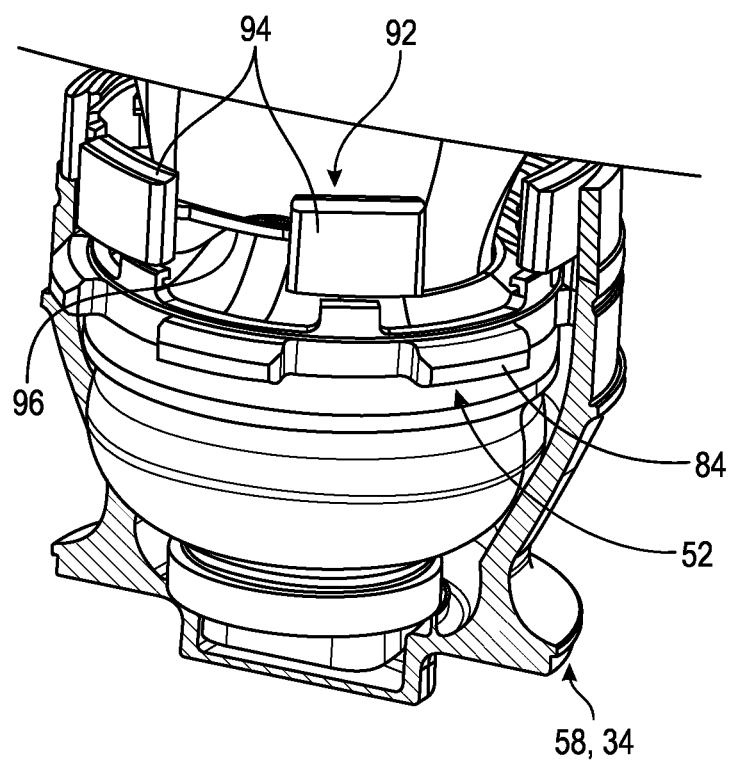
FIG. 15 is a schematic perspective view in partial axial cross-section of the root of the vane and of the system of FIG. 8, and shows a fourth mounting step.

In the fourth step illustrated in FIGS. 15 and 16, the annulus 92 is angularly positioned about the setting axis "A" so that its skids 94 are aligned with the spaces located between the teeth 82, 84. The annulus 92 is then displaced in axial translation within the cup 58 until the skids 94 are engaged in these spaces. The bridges 96 can then rest on the teeth 84 of the ring 52. The annulus 92 thus prevents any rotation of the ring 52 inside the cup 58.

In the final step shown in FIG. 17, the snap ring 100 is engaged in the circumferentially aligned grooves 86, 98. The snap ring 100 prevents an accidental dismounting of the annulus 92.

The sectors 79a, 79b of the support member 79 are then positioned in the cup 58. Each sector 79a, 79b is introduced into the space "E" reserved radially between the wall 58a of the cup 58 and the stilt 30. Each sector 79a, 79b is then positioned by being pressed radially against the internal annular face 59b of the cup 58 and axially upwards against the shoulder face 87 of the rim 89. The sectors 79a, 79b are then attached in this position, for example by means of screws and crimped nuts.

In the embodiment shown in FIG. 8, the prongs 77 extend axially over the bulb 32 but do not extend over the immobilisation ring 52.

Figure 20:
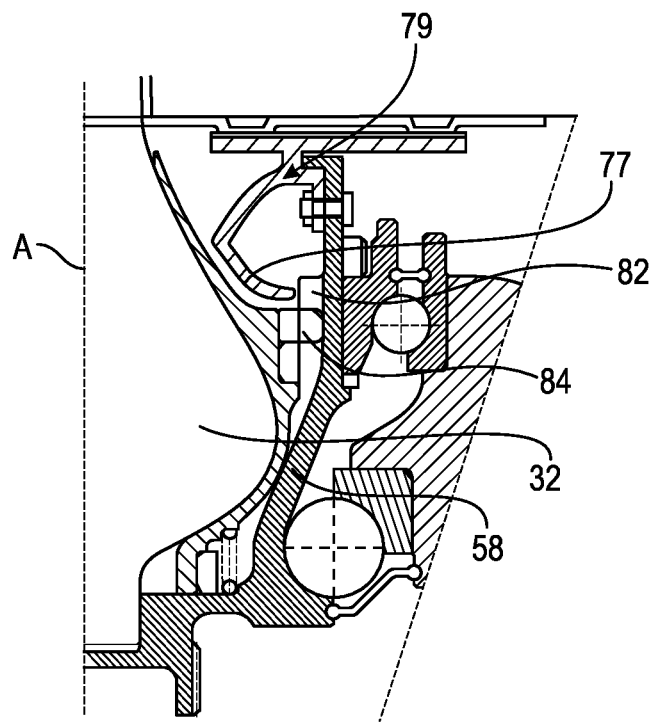
FIG. 20 is a half-view similar to FIG. 8 which shows a third embodiment of the retention prong.

Alternatively, as shown in FIG. 20, the free end of the prongs 77 extends axially opposite the upper surface of the immobilisation ring 52. Thus, the prongs 77 also participate in the retention of the immobilisation ring 52 inside the cup 58.

It is understood that the dismounting of the vane 10 is carried out by carrying out the aforementioned steps in reverse order. It is also understood that one of the essential steps in the mounting and the dismounting of the root 14 is the immobilisation ring 52. This ring 52 can be manipulated from the outside of a turbine engine, which is particularly advantageous during a maintenance operation. A vane 10 can be dismounted and removed from the propeller by dismounting and removing a minimum number of parts.

Reference is made to FIG. 18 which illustrates an alternative embodiment of the immobilisation ring 52'. This ring 52' is wedge-shaped in cross-section and is configured, under the effect of centrifugal forces during operation, to be biased axially outwards from the cup 58 and to maintain the root 14 of vane 10 axially tightened by wedge effect.

In the example shown, the ring 52' is generally trapezoidal in axial half-cross-section and comprises a lower surface 102 and two lateral surfaces, internal 104 and external 106 respectively. The surfaces 102-106 are annular and extend around the setting axis "A".

The ring 52' is engaged around the root 14 and in the cup 58 and is axially supported by its surface 102 on the shrink-fitting ring 50, here by means of a washer 108.

The external surface 106 of the ring cooperates by axial support and sliding with a complementary ring 110 mounted inside the cup 58 and around the ring 52'.

The ring 52' is sectored and formed of a plurality of sectors arranged around the setting axis "A" at a certain circumferential distance from each other. As a non-limiting example, the sectors are six in number and evenly distributed around the setting axis "A".

Finally, a nut 112 is screwed onto an internal thread of the upper end of the cup 58 and cooperates by bearing and axial sliding with the internal surface 104 of the ring 52'.

The screwing and the tightening of the nut 112 causes both an axial displacement of the sectors of the ring 52' resting on the washer 108, and a radial biasing of these sectors against the ring 110 of complementary shape. Any mounting clearance is then removed.

The cuff 26 comprises a cylindrical shoulder 114 resting against a complementary cylindrical shoulder 116 of the cup 58, here at the junction between the middle portion 42 and the lower end of the cuff 26. The interest of this variant is in particular to take up the centrifugal forces in order to achieve the retention of the vane 10 but also to replace the aforementioned member 66 by directly applying a pre-stress between the cuff 26 and therefore the root 14 of the vane 10, and the inner ring 54a of the bearing 54.

The support member 79 comprising the prongs 77 and supporting the plate 95 is of course applicable to this embodiment, as shown in FIG. 18.

Other variant embodiments not shown are possible, including:
  the half-shells 26a, 26b of the cuff 26 can be fitted to the body 24 by bolting, riveting, welding, etc.;
  the glue for connecting the cuff 26 to the body 24 may be an epoxy glue, but it may also be an elastomer or a thermoplastic glue. It is also possible to use a non-stick film to allow for relative movement while limiting the wear by friction;
  still on the subject of the cuff/body interface 24, several technical solutions can also be combined together among those proposed (gluing, pre-stressed by washers or springs, pre-stressed by the geometry of the cuff); these solutions can be combined independently of the existence of a clearance between the two portions of the cuff;

Although less advantageous, the radial position of the bearing that ensures the centrifugal retention of the vane 10 can be reversed with the radial position of the bearing that ensures the absorption of the bending moments resulting from aerodynamic and centrifugal forces.

In all these embodiments, when the immobilisation ring 52, 52' is no longer in a state to immobilize the root 14 of vane 10, the bulb 32 displaces axially outwards along the setting axis "A". The bulb 32 comes into contact with the prongs 77 so as to cause their deformation, which sufficiently slows down the vane 10, which can be retained inside the cup 58 by the deformed prongs 77. The centrifugal forces exerted by the vane 10 are transmitted to the hub via the attachment tab 81 which is axially supported against the shoulder face 87 which thus transmits the centrifugal force to the cup 58 which itself transmits the force to the hub 72 via the rolling bearings 54, 56. In this way, the centrifugal force does not pass through the attachment screws of the support members 79, which are received with a sufficient radial clearance in their respective orifices.

The invention claimed is:

1. An assembly for an aircraft turbine engine, the assembly comprising:
    an un-ducted propeller vane having a root configured to be attached to a hub of the propeller and which is configured to be received in an associated opening of an external casing of the hub, the root having a bulbous-shaped segment;
    a system for setting the pitch of the vane about a setting axis, the pitch setting system comprising a cup which is configured to be arranged inside the external casing, which comprises an open flared upper end for the axial insertion of the root into an annular wall of the cup, and in which the root of the vane is axially attached by an immobilization member which is attached to the cup, the cup configured to be pivotally mounted about the setting axis with respect to the hub; and
    at least one retention prong extending radially from the wall of the cup into a radial space reserved between the wall of the cup and the root, the at least one retention prong being arranged axially opposite the bulb, the at least one retention prong being capable of retaining the root of the vane inside the cup by contact with the bulb in the event of failure of the immobilization member,
    wherein the at least one retention prong can bend to dampen a displacement of the root of the vane axially in the event of failure of the immobilization member.

2. The assembly of claim 1, wherein the at least one retention prong is made in one part with a support member which is fitted and attached to the cup.

3. The assembly of claim 2, wherein the support member comprises an axial attachment tab which is attached against an internal face of the cup and from which the at least one retention prong extends radially.

4. The assembly of claim 2, wherein the support member comprises a radial attachment plate for attaching a platform configured to obturate the associated opening in the casing, the radial attachment plate being arranged at an upper end of the attachment tab, the radial attachment plate extending above an upper end edge of the cup.

5. The assembly of claim 4, wherein the at least one retention prong has a main stretch directed radially inwards from the attachment tab and an end stretch curved radially outwards to promote the deformation of the at least one retention prong in the event of axial displacement of the root of the vane.

6. The assembly of claim 5, wherein the at least one retention prong is elastically deformable in bending over at least one portion of a bending movement of the at least one retention prong.

7. The assembly of claim 2, wherein the support member comprises a plurality of the at least one retention prong which are regularly distributed around the root of the vane.

8. The assembly of claim 2, wherein the support member is made in a plurality of separate sectors each of which is independently attached to the cup.

9. The assembly of claim 2, wherein the cup comprises a shoulder face which extends radially inwardly from an internal face of the cup and which axially supports upwardly the support member.

10. The assembly of claim 9, wherein the support member is attached to the cup by an attachment screw which is received in through orifices having a diameter greater than the diameter of a rod of the attachment screw, the attachment screw being screwed into a nut mounted with a radial run-out in the orifice of the cup or in the orifice of the immobilization member so that axial forces applied to the at least one retention prong upwards pass only through the shoulder face against which the immobilization member abuts.

11. The assembly of claim 1, wherein in the attached position of the root of the vane in the cup, the at least one retention prong is arranged axially at a distance from the bulb of the root.

12. The assembly of claim 1, wherein in the attached position of the root of the vane in the cup, the at least one retention prong is arranged pre-stressed in bending against the bulb of the root.

13. The assembly of claim 1, wherein the immobilization member is formed by an immobilization ring which extends around the setting axis and which is configured to be mounted around the root, the immobilization ring being configured to be mounted inside the cup and to cooperate respectively with the root and the annular wall of the cup to ensure the axial retention of the root in the cup.

14. The assembly of claim 13, wherein a segment of the at least one retention prong extends axially opposite the immobilization ring.

15. A turbine engine for an aircraft, comprising at least one assembly according to claim 1.

* * * * *